United States Patent
Ibuki et al.

(10) Patent No.: US 9,500,777 B2
(45) Date of Patent: Nov. 22, 2016

(54) ANTIREFLECTION FILM, POLARIZING PLATE, IMAGE DISPLAY DEVICE AND A MANUFACTURING METHOD FOR ANTIREFLECTION FILM

(71) Applicant: FUJIFILM Corporation, Tokyo (JP)

(72) Inventors: Shuntaro Ibuki, Kanagawa (JP); Nobuyuki Akutagawa, Kanagawa (JP); Miho Asahi, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/640,503

(22) Filed: Mar. 6, 2015

(65) Prior Publication Data

US 2015/0253466 A1 Sep. 10, 2015

(30) Foreign Application Priority Data

Mar. 7, 2014 (JP) ................. 2014-045721

(51) Int. Cl.
| | | |
|---|---|---|
| *G02B 1/11* | (2015.01) | |
| *G02B 1/12* | (2006.01) | |
| *G02B 5/30* | (2006.01) | |
| *G02B 1/111* | (2015.01) | |
| *G02B 1/118* | (2015.01) | |

(52) U.S. Cl.
CPC ............. *G02B 1/111* (2013.01); *G02B 1/118* (2013.01); *G02B 1/12* (2013.01); *G02B 5/3033* (2013.01); *C08J 2333/12* (2013.01); *C08J 2427/20* (2013.01); *C08J 2429/10* (2013.01); *C08J 2435/02* (2013.01)

(58) Field of Classification Search
CPC ........ G02B 1/111; G02B 1/12; G02B 5/3033
See application file for complete search history.

(56) References Cited

U.S. PATENT DOCUMENTS

| | | | | |
|---|---|---|---|---|
| 2007/0092663 A1* | 4/2007 | Murakami | ................. | C08J 5/18 428/1.31 |
| 2007/0146887 A1* | 6/2007 | Ikeda | ...................... | G02B 1/111 359/586 |
| 2009/0214871 A1* | 8/2009 | Fukuda | .................... | C09D 4/00 428/413 |
| 2009/0246490 A1* | 10/2009 | Ibuki | ........................ | G02B 5/02 428/212 |
| 2009/0316084 A1* | 12/2009 | Yajima | ................ | B29C 47/0021 349/96 |
| 2010/0027116 A1* | 2/2010 | Ibuki | ...................... | G02B 1/105 359/488.01 |

FOREIGN PATENT DOCUMENTS

| | | |
|---|---|---|
| JP | 2011-070116 A | 4/2011 |
| JP | 5038748 B2 | 10/2012 |
| JP | 2013-000693 A | 1/2013 |

OTHER PUBLICATIONS

Machine translation of JP-A-11-038,202 from https://www4.j-platpat.inpit.go.jp/cgi-bin/tran_web_cgi_ejje?u=http://www4.j-platpat.inpit.go.jp/eng/translation/20160414020003894615217965-23971723732355FAAF16159FC2022429D6C8D4AE; downloaded on Apr. 13, 2016.*

* cited by examiner

*Primary Examiner* — Frank Font
(74) *Attorney, Agent, or Firm* — Jean C. Edwards, Esq.; Edwards Neils LLC

(57) ABSTRACT

There is provided an antireflection film having a surface haze of less than 1.0%, including: a light transmitting layer; and an antireflection layer, wherein the antireflection layer includes a specific unevenness structure on a surface at a side opposite to a side at which the light transmitting layer is provided, the specific unevenness structure made from specific raw materials.

15 Claims, 1 Drawing Sheet

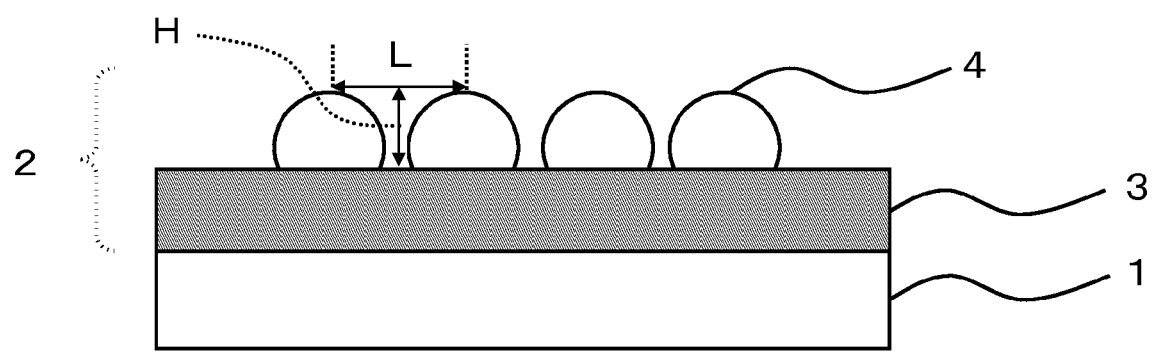

ANTIREFLECTION FILM, POLARIZING PLATE, IMAGE DISPLAY DEVICE AND A MANUFACTURING METHOD FOR ANTIREFLECTION FILM

CROSS-REFERENCE TO RELATED APPLICATION(S)

The present application claims priority from Japanese Patent Application Nos. 2014-045721 filed on Mar. 7, 2014, the entire contents of which are incorporated herein by reference.

BACKGROUND

1. Field

The present invention relates to an antireflection film, a polarizing plate, an image display device and a manufacturing method for antireflection film.

2. Description of Related Art

On an image display device such as a cathode ray tube (CRT) display device, a plasma display panel (PDP), an electroluminescence display (ELD), a vacuum fluorescent display (VFD), a field emission display (FED) and a liquid crystal display (LCD), an antireflection film is provided in some cases for preventing deterioration of contrast due to reflection of natural light at a surface thereof or of glare.

An antireflection film is required to a low reflection index because the antireflection film is provided at a surface of a display for preventing reflection of natural light or occurrence of glare. The antireflection film is also required to a high mechanical strength such as scratch resistance, transparency, or the like. Thus, the antireflection film is formed by layering a substrate, a functional layer such as a hardcoat layer or a high refractive index layer on the substrate, and a low refractive index layer having a suitable thickness and a lower refractive index than one of the substrate, in this order.

As an antireflection film, an antireflection film having a fine unevenness shape on a surface of the substrate, of which a period is shorter than wavelength of visible rays, has been known. Such a fine unevenness structure is a so-called moth-eye structure. Due to the moth-eye structure, a pseudo refractive index incline layer in which a refractive index is continuously varied from air toward a bulk material at an inside of the substrate is formed. That is, by not having an intersurface of refractive index, it is possible to prevent reflection of light.

As an antireflective index layer having a moth-eye structure, JP-A-2011-70116 discloses a manufacturing method for an antireflection film having a moth-eye structure being excellent in adhesion property with a substrate, the manufacturing method including directly applying an antireflection composition containing a binder in which a molecular weight and the number of functional groups are defined on a light transmitting substrate, forming an unevenness structure on a surface of the antireflection film by using a mold for forming an antireflection film, of which a period is shorter than wavelength of visible rays, peeling the mold for forming antireflection film.

JP-B-5,038,748 discloses a manufacturing method for an antiglare film having an unevenness surface, including using two kinds of polymers having specific structures without using a mold to form a phase separation structure by spinodal decomposition from a liquid phase, and continuously curing the precursor.

JP-A-2013-693 discloses a method for forming a fine unevenness structure by radiating far infrared radiation to an antireflection composition as a method for forming a moth-eye structure of which a period is shorter than wavelength of visible rays, rather than an unevenness structure being optically large, without using a complicated mold.

However, an invention of JP-A-2011-70116 requires forming a mold having a fine unevenness structure of which a period is shorter than wavelength of visible rays to exhibit an excellent antireflection property. Further, it is necessary to continuously repeatedly use the mold while keeping the unevenness structure of the mold (that is, a complex process which is difficult in control is required), for continuously forming an antireflection film having a moth-eye structure.

The method recited in JP-B-5,038,748 method for forming an unevenness structure. However, an average distance between domains of a phase separation structure is 1-70 μm. Accordingly, it cannot be obtained an antireflection film having a moth-eye structure which requires a fine period of unevenness shorter than wavelength of visible rays, even if large unevenness in optical for antiglare property can be obtained.

In an invention of JP-A-2013-693, a period of unevenness of an obtained film is 1 μm, which exceeds wavelength of visible rays. Therefore, a reflection index at a shorter wavelength side in a wavelength range of visible rays is not lowered, and it cannot be said that the obtained film has a moth-eye structure. An invention of JP-A-2013-693 also requires a far infrared ray dryer for radiating far infrared ray, and therefore it is not simple manufacturing method.

To wrap up, it has been desired a technique for simply manufacturing an antireflection film having an unevenness structure (a moth-eye structure) of which a period is shorter than wavelength at a shorter wavelength side in a wavelength range of visible rays without using a complicated process such as using a mold or a special apparatus such as a far infrared ray dryer.

That is, an objective of the present invention is to provide an antireflection index layer having a moth-eye structure, which can be simply manufactured and has a low reflection index.

The present inventors have intensively studied the above problems. As a result, they have found that the following methods can form a moth-eye structure in which a sea part is a convex portion and an island part is a concave portion and have completed the present invention. The following method includes using (A) an ionizing radiation curable monomer including two or more polymerizable group in a molecular and (B) an ionizing radiation curable polymer including two or more polymerizable group, and having a SP value lower by 0.5 or more than the ionizing radiation curable monomer (A), viscosity larger by 100 mPa·s than the ionizing radiation curable monomer and a mass average molecular weight of 1000 or more so as to: adjust an area ratio of the sea part and the island part (area of the sea part/area of the island part) at outermost surface of an antireflection film to be 1.0 or more wherein the sea part is the curable monomer (A) and the island part is the curable polymer (B); form a size of the island part smaller than a short wavelength in a wavelength range of visible rays to obtain a phase separation structure in which a distance between island parts (i.e., a period of convexes) is smaller than a short wavelength in the wavelength range of visible rays; permeate the curable monomer (A) into an underlayer; and adjust the island part and the sea part to be a convex portion and a concave portion, respectively, by utilizing a characteristic that the curable polymer (B) is low shrinkage and the curable monomer (A) is high shrinkage at curing by using irradiation of ionizing radiation.

SUMMARY

According to an exemplary embodiment of the present invention, the followings may be provided.

[1] An antireflection film, including: a light transmitting layer; and an antireflection layer, wherein the antireflection layer includes an unevenness structure on a surface at a side opposite to a side at which the light transmitting layer is provided, the unevenness structure includes a phase separation structure in a sea-island form, the phase separation structure in the sea-island form includes: a sea part containing a cured product of an ionizing radiation curable monomer (A) including two or more polymerizable groups in a molecule; and an island part containing an ionizing radiation curable polymer (B) including two or more polymerizable groups, and having a SP value lower by 0.5 or more than the ionizing radiation curable monomer (A), a viscosity larger by 100 mPa·s than the ionizing radiation curable monomer (A) and a mass average molecular weight of 1000 or more, the island part protrudes from the sea part to be a convex portion in the unevenness structure, an area ratio of the sea part to the island part at an outermost surface of the antireflection layer is 1.0 or more, a size of the island part which is the convex portion, and a period of a distance between convex portions adjacent to each other are 380 nm or less, and a surface haze of the antireflection film is less than 1.0%.

[2] The antireflection film according to [1], wherein a thickness of the antireflection layer is 0.05 to 0.78 μm.

[3] The antireflection film according to [1], wherein the antireflection layer further contains an inorganic fine particle (D) surface-treated with a silane coupling agent and having an average diameter of 10 to 300 nm.

[4] The antireflection film according to [3], wherein a molecular weight of the silane coupling agent is 90 to 600.

[5] The antireflection film according to [3], wherein a surface-modified ratio α of the silane coupling agent is 0.1 to 25%.

[6] The antireflection film according to [3], wherein the inorganic fine particle (D) is a metal oxide fine particle having a refractive index of 1.46 or less and at least containing a silicon atom at least a surface of the metal oxide fine particle.

[7] The antireflection film according to [1], wherein the ionizing radiation curable polymer (B) including two or more polymerizable group is a fluorine-containing polymer represented by formula (1):

(MF1)$a$-(MF2)$b$-(MF3)$c$-(MA)$d$-(MB)$e$-(MC)$f$-(MD)$g$   formula (1)

wherein a to f each represent a molar ratio of each unit, g represents a mass % in the fluorine-containing polymer, and a to g satisfies relationships of $0 \leq a \leq 70$, $0 \leq b \leq 70$, $0 \leq c \leq 80$, $30 \leq a+b+c \leq 90$, $1 \leq d \leq 50$, $0 \leq e \leq 50$, $0 \leq f \leq 50$ and $0 \leq g \leq 15$, (MF1) represents a unit obtained by polymerizing a monomer represented by "$CF_2=CF-Rf_1$", wherein $Rf_1$ represents a perfluoroalkyl group having 1 to 5 carbon atoms, (MF2) represents a unit obtained by polymerizing a monomer represented by "$CF_2=CF-ORf_{12}$", wherein $Rf_{12}$ represents a fluorine-containing alkyl group having 1 to 30 carbon atoms, (MF3) represents a unit obtained by polymerizing a monomer represented by "$CH_2=CRo-L-Rf_{13}$", wherein Ro represents a hydrogen atom, a halogen atom or a methyl group, L represents a divalent linking group and $Rf_{13}$ represents a fluorine-containing alkyl group having 1 to 20 carbon atoms, (MA) represents a unit including at least one of a group having an unsaturated double bond and a ring-opening polymerizable group, (MB) represents an uncrosslinkable unit, (MC) represents a unit obtained by polymerizing a monomer having at least one polyalkylene oxide group, represented by formula (2):

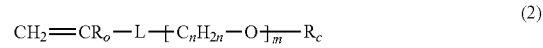

wherein Ro represents a hydrogen atom, a halogen atom or a methyl group, L represents a divalent linking group, Rc represents a hydrogen atom or an alkyl group having 1 to 10 carbon atoms, m represents an integer of 2 to 50, n represents an integer of 1 to 5, and when m is two or more, a plurality of "—($C_nH_{2n}$-O)—" may be different, and (MD) represents a unit containing at least one polysiloxane structure.

[8] The antireflection film according to [7], wherein L in formula (2) is a divalent linking group having 1 to 9 carbon atoms. [9] A manufacturing method for an antireflection film including a light transmitting layer and an antireflection layer, wherein the antireflection layer includes an unevenness structure on a surface at a side opposite to a side at which the light transmitting layer is provided, the method including: applying, above the light transmitting layer, a composition containing: an ionizing radiation curable monomer (A) including two or more polymerizable groups in a molecule; an ionizing radiation curable polymer (B) including two or more polymerizable groups, and having a SP value lower by 0.5 or more than the ionizing radiation curable monomer (A), a viscosity larger by 100 mPa·s than the ionizing radiation curable monomer (A) and a mass average molecular weight of 1000 or more; a polymerization initiator (C); and a solvent permeable into the light transmitting or an underlayer; phase-separating the ionizing radiation curable monomer (A) and the ionizing radiation curable polymer (B) in a sea-island form; permeating a part of the ionizing radiation curable monomer (A) into the light transmitting layer or the underlayer; and curing the ionizing radiation curable monomer (A) and the ionizing radiation curable polymer (B) to form an antireflection layer having a phase separation structure in the sea-island form including a sea part constituted by a cured product of the ionizing radiation curable monomer (A) and an island part constituted by a cured product of the ionizing radiation curable polymer (B) and protruding from the sea part to be a convex portion, wherein an area ratio of the sea part to the island part at an outermost surface of the antireflection layer is 1.0 or more, and a size of the island part which is the convex portion, and a period of a distance between convex portions adjacent to each other are 380 nm or less.

[10] The manufacturing method for an antireflection film according to [9], wherein the solvent (E) contains a solvent having a boiling point of more than 100° C.

[11] A polarizing plate including: a polarizing film; and at least one protective film for protecting at least one surface of the polarizing film, wherein the at least one protective film is the antireflection film according to [1] or an antireflection film manufactured by the manufacturing method for an antireflection film according to [9].

[12] An image display apparatus, including: the antireflection film according to [1], an antireflection film manufactured by the manufacturing method for an antireflection film according to [9], or the polarizing plate according to [12].

According to an exemplary embodiment of the present invention, there can be provided an antireflection film having a moth-eye structure having a low reflection index, which can be manufactured by a simple method.

BRIEF DESCRIPTION OF DRAWINGS

FIG. 1 is a cross-section schematic view showing an example of an antireflection film of the present invention.

DETAILED DESCRIPTION OF EXEMPLARY EMBODIMENT

An antireflection film in an exemplary embodiment of the present invention is an antireflection film, including: a light transmitting layer; and an antireflection layer, wherein the antireflection layer includes an unevenness structure on a surface at a side opposite to a side at which the light transmitting layer is provided, the unevenness structure includes a phase separation structure in a sea-island form, the phase separation structure in the sea-island form includes: a sea part containing a cured product of an ionizing radiation curable monomer (A) including two or more polymerizable groups in a molecule; and an island part containing an ionizing radiation curable polymer (B) including two or more polymerizable groups, and having a SP value lower by 0.5 or more than the ionizing radiation curable monomer (A), a viscosity larger by 100 mPa·s than the ionizing radiation curable monomer (A) and a mass average molecular weight of 1000 or more, the island part protrudes from the sea part to be a convex portion in the unevenness structure, an area ratio of the sea part to the island part at an outermost surface of the antireflection layer is 1.0 or more, a size of the island part which is the convex portion, and a period of a distance between convex portions adjacent to each other are 380 nm or less, and a surface haze of the antireflection film is less than 1.0%.

A manufacturing method for an antireflection film in an exemplary embodiment of the present invention is a manufacturing method for an antireflection film including a light transmitting layer and an antireflection layer, wherein the antireflection layer includes an unevenness structure on a surface at a side opposite to a side at which the light transmitting layer is provided, the method including: applying, on the light transmitting layer, a composition containing: an ionizing radiation curable monomer (A) including two or more polymerizable groups in a molecule; an ionizing radiation curable polymer (B) including two or more polymerizable groups, and having a SP value lower by 0.5 or more than the ionizing radiation curable monomer (A), a viscosity larger by 100 mPa·s than the ionizing radiation curable monomer (A) and a mass average molecular weight of 1000 or more; a polymerization initiator (C); and a solvent permeable into the light transmitting or an underlayer; phase-separating the ionizing radiation curable monomer (A) and the ionizing radiation curable polymer (B) in a sea-island form; permeating a part of the ionizing radiation curable monomer (A) into the light transmitting layer or the underlayer; and curing the ionizing radiation curable monomer (A) and the ionizing radiation curable polymer (B) to form an antireflection layer having a phase separation structure in the sea-island form including a sea part constituted by a cured product of the ionizing radiation curable monomer (A) and an island part constituted by a cured product of the ionizing radiation curable polymer (B) and protruding from the sea part to be a convex portion, wherein an area ratio of the sea part to the island part at an outermost surface of the antireflection layer is 1.0 or more, and a size of the island part which is the convex portion, and a period of a distance between convex portions adjacent to each other are 380 nm or less.

Hereinafter, an antireflection film and a manufacturing method for the antireflection film of an exemplary embodiment of the present invention are described in detail.

FIG. 1 is a cross-section schematic view showing an example of an antireflection film of the present invention.

An antireflection film 10 of FIG. 1 includes a light transmitting substrate 1 and an antireflection layer 2 having an unevenness structure at a surface thereof at a side opposite to the light transmitting substrate 1 is provided. The antireflection layer 2 has a phase separation structure in a sea-island form including a sea part 3 constituted by a cured product of the following component (A) and an island part 4 constituted by a cured product of the following component (B) and protruding from the sea part 3 to form a convex portion.

The island part (4) (convex portion) has a period L of 380 nm or less.

Component (A): ionizing radiation curable monomer having two or more polymerizable groups in a molecular.

Component (B): ionizing radiation curable polymer including two or more polymerizable group, and having a SP value lower by 0.5 or more than the ionizing radiation curable monomer (A), viscosity larger by 100 mPa·s than the ionizing radiation curable monomer and a mass average molecular weight of 1000 or more.

The antireflection film of an exemplary embodiment of the present invention has a period of the convex portion in the unevenness structure at the surface of the antireflection layer of 380 nm or less. Here, a "period" of the convex portion means an average value obtained by calculating 50 measured distances between convex portions adjacent to each other (L in FIG. 1). The distance between convex portions adjacent to each other may be measured through SEM observation of a cross-section of the antireflection film. The SEM observation is performed with a suitable magnification (about 50000-fold) after cutting a sample of the antireflection film with a microtome to expose a cross-section. To facilitate the observation, the sample may be subjected to a suitable treatment such as a carbon deposition and an etching.

Due to the period of the convex portion of 380 nm or less, a moth-eye structure may be obtained, and a reflection index of visible rays may be lowered.

The period of the convex portion is preferably 380 nm or less, more preferably 200 nm or less, and further preferably 152 nm or less.

The lower limit of the period of the convex portion is not particularly limited. In an aspect of lowering a reflection index, it is preferred that convex portions are not in contact with each other. In light of this aspect, the period of the convex portion is preferably larger by 1 nm or more than a size of the convex portion, and more preferably larger by 10 nm or more than the size of the convex portion.

When the period of the convex portion is larger by 1 nm or more than the size of the convex portion, the height of the convex portion (H in FIG. 1) to the distance between the convex portions (L in FIG. 1) is 0.5 L or more. In this case, it may be formed a refractive index incline layer in which a refractive index is more gradually varied from air toward an inside of the antireflection layer, and therefore an effect of lowering a reflection index may become large.

In order to control the period of the convex portion, there are three factors (1) to (3) below.

(1) Difference of Hydrophilicity (Hydrophobicity) of the Curable Monomer (A) and the Curable Polymer (B) being Hydrophobic than the Curable Monomer (A)

When the difference becomes large, since the island part of the curable polymer (B) has smaller contact area in the sea part of the curable monomer (A), the period of the convex portion becomes large.

(2) Molecular Weight of the Curable Monomer (A) and the Curable Polymer (B)

Since a size of one island part becomes large when a molecular weight of the curable polymer (B) becomes large, the period of the convex portion (island part) becomes small. Also, since viscosity of the convex portion (island part) becomes small when a molecular weight of the curable monomer (A) becomes small, the curable polymer (B) is easily collected, and therefore the period of the convex portion (island part) becomes large.

(3) Ratio of Curable Monomer (A) (Hydrophilic Monomer) to Curable Polymer (B) (Hydrophobic Polymer)

When the ratio of the curable monomer (A) to the curable polymer (B) becomes large, since an area of the sea part becomes large, and therefore the period of the convex portion (island part) becomes large.

The curable monomer (A) is permeated into an underlayer (a light transmitting substrate or another functional layer), and the curable monomer (A) has a high shrinkage property and the curable polymer (B) has a low shrinkage property. By these, the island part constituted by the cured product of the curable polymer (B) protrudes from the sea part constituted by the cured product of the curable monomer (A) to form the convex portion.

A surface haze of the antireflection film in an exemplary embodiment of the present invention is less than 1.0%, preferably 0.8% to 0.05%, and more preferably 0.6% to 0.1%, from the viewpoints of contrast in a bright room and black tightness.

<(A) Ionizing Radiation Curable Monomer having Two or More Polymerizable Groups in a Molecule>

The ionizing radiation curable monomer (A) having two or more polymerizable group in a molecule (hereinafter, sometimes referred to as "component (A)") constituting the sea part (concave portion) of the antireflection layer will be described below.

The component (A) is preferably a monomer having a reactive group capable of crosslinking by ionizing radiation, more preferably a resin component containing a polyfunctional monomer having two or more functional group, and further preferably a resin component containing a polyfunctional monomer having three or more functional group. The component (A) preferably contains no fluorine group in a molecular.

The component (A) preferably has a larger surface free energy than one of the component (B) to be described below. The component (A) is preferably a curable monomer capable of forming a cured layer having a surface free energy of 30 mN/m or more, more preferably 35 to 80 mN/m, and particularly preferably 40 to 60 mN/m. Also, a difference of surface free energy of the component (B) below and the component (A) is preferably 5 mN/m or more, and more preferably 10 mN/m or more and 40 mN/m or less.

By falling within this range, a phase separation structure is easily formed when using the coat composition in an exemplary embodiment of the present invention. When surface free energy after curing is too high or low, lowering of reflection index or unevenness is occurred in some cases. The surface free energy is preferably the lower limit or more in the above range from the viewpoints of strength and application property.

In order to form the phase separation structure in a sea-island form by the components (A) and (B), separation property of the components (A) and (B) is preferably large.

The separation property of the components (A) and (B) can be presumed from thermodynamic and dynamical considerations. For example, it has been known that when measuring free energy of mixing ($\Delta G = \Delta H - T \cdot \Delta S$) which is an index of separation property in Flory-Huggins, the separation property may be presumed as a function of a polymerization degree, a volume ratio ($\phi$: called a composition ratio in the following reference), and an interaction parameter ($\chi$). (See, for example, "Polymer-Polymer Phase Behavior", Bates, Science, Vol. 251, pp. 898-905, 1991, or "Koubunshi-no-Butsuri", Strobl, edited by Springer Verlag Japan, 1998)

When $\Delta G$ is larger than 0, the two components tend to be separated, and $\Delta G$ is smaller than 0, the two components tend to be mixed. In order to form the phase separation structure in a sea-island form, constituted by the components (A) and (B), $\Delta G$ of the components (A) and (B) is preferably larger than 0. From the viewpoint of promoting separation and reducing turbulence at an interface of phases, AG is preferably 0.01 or more.

A functional group contained in the component (A) is preferably a photopolymerizable group, an electron beam polymerizable group or a radiation polymerizable group. Among them, a photopolymerizable group is preferable.

Examples of a photopolymerizable group include a unsaturated polymerizable functional group such as a (meth)acryloyl group, a vinyl group, a styryl group and an allyl group, or the like. Among them, a (meth)acryloyl group is preferable from the viewpoint of reactivity.

From the viewpoints of improvement of scratch resistance and fixing the phase separation structure in a sea-island form, the component (A) preferably contains a compound having two or more unsaturated double bonds.

Examples of the component (A) containing a photopolymerizable functional group include: a di(meth)acrylate of an alkylene glycol such as neopentylglycol diacrylate, 1,6-hexanediol (meth)acrylate and propylene glycol (meth)acrylate; a di(meth)acrylate of a polyoxylalkylene glycol such as triethylene glycol di(meth)acrylate, dipropylene glycol di(meth)acrylate, polyethylene glycol di(meth)acylate and polypropylene glycol di(meth) acrylate; a di(meth)acylate of a polyhydric alcohol such as pentaerythritol di(meth)acrylate; a di(meth)acylate of an ethylene oxide adduct or a propylene oxide adduct such as 2,2-bis{4-(acryloxy•diethoxy)phenyl}propane, and 2-2-bis{4-(acryloxy•polypropoxy)phenyl}propane; or the like.

In addition, epoxy (meth)acrylates, urethane (meth)acrylates, polyester (meth)acrylates are preferable as a photopolymerizable polyfunctional monomer.

Among them, esters of a polyhydric alcohol and a (meth) acrylate are preferable. Further, a polyfunctional monomer having three or more a (meth)acryloyl groups is more preferable. Specifically, trimethylolpropane tri(meth)acrylate, trimethylolethane tri(meth)acrylate, 1,2,4-cyclohexane tetra(meth)acrylate, pentaglycerol triacrylate, pentaerythritol tetra(meth)acrylate, pentaerythritol tri(meth)acrylate, (di)pentaerythritol triacrylate, (di)pentaerythritol pentaacrylate, (di)pentaerythritol tetra(meth)acrylate, (di)pentaerythritol hexa(meth)acrylate, tripentaerythritol triacrylate, tripentaerythritol hexatriacrylate, and the like are exemplified. In this specification, "(meth)acrylate", "(meth)acrylic acid" and "(meth)acryloyl" mean "acrylate or methacrylate", "acrylic acid or methacrylic acid" and "acryloyl group or methacryloyl group", respectively.

The component (A) may contain monomers having different refractive indexes to control a refractive index in each layer. Examples of a monomer having a high refractive index include bis(4-methacryloyl thiophenyl)sulfide, vinylnaphtalene, vinylphenylsulfide, 4-methacryloxyphenyl-4'-methoxyphenylthioether, and the like.

Also, the dendrimers disclosed in JP-A-2005-76005, JP-A-2005-36105, or the like, or a monomer having norbornene ring disclosed in JP-A-2005-60425 or the like may be used as the component (A).

Two or more polyfunctional monomers may be used in combination.

<(B) Ionizing Radiation Curable Polymer Including Two or More Polymerizable Group, and having an SP Value Lower by 0.5 or More than the Ionizing Radiation Curable Monomer (A), Viscosity Larger by 100 mPa·s than the Ionizing Radiation Curable Monomer and a Mass Average Molecular Weight of 1000 or More>

An ionizing radiation curable polymer (B) including two or more polymerizable group, and having a SP value lower by 0.5 or more than the ionizing radiation curable monomer (A), viscosity larger by 100 mPa·s than the ionizing radiation curable monomer and a mass average molecular weight of 1000 or more will be described below. The ionizing radiation curable polymer (B) constitutes the island part (convex portion) of the antireflection layer.

Since the curable polymer (B) is required to be cured to form the island part, the curable polymer (B) may include at least two polymerizable groups in a molecular. Indeed, since hardness of the cured island part is large as density of the polymerizable is high, the number of polymerizable groups in a molecular is preferably large.

Also, the component (B) may not be a fluorine-containing polymer. However, the component (B) is preferably a fluorine-containing polymer represented by formula (1) or formula (3) because a SP value becomes low.

<Fluorine-containing Polymer having Polyalkylene Oxide Group in a Molecule and Represented by Formula (1)>

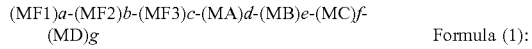

Formula (1):

In formula (1), a to f each represent a molar ratio of each unit, g represents a mass % in a fluorine-containing polymer, and a to g satisfies relationships of $0 \leq a \leq 70$, $0 \leq b \leq 70$, $0 \leq c \leq 80$, $30 \leq a+b+c \leq 90$, $1 \leq d \leq 50$, $0 \leq e \leq 50$, $0 \leq f \leq 50$ and $0 \leq g \leq 15$.

(MF1) represents a unit obtained by polymerizing a monomer represented by "$CF_2=CF-Rf_1$", wherein $Rf_1$ represents a perfluoroalkyl group having 1 to 5 carbon atoms.

(MF2) represents a unit obtained by polymerizing a monomer represented by "$CF_2=CF-ORf_{12}$", wherein $Rf_{12}$ represents a fluorine-containing alkyl group having 1 to 30 carbon atoms.

(MF3) represents a unit obtained by polymerizing a monomer represented by "$CH_2=CRo-L-Rf_{13}$", wherein Ro represents a hydrogen atom, a halogen atom or a methyl group, L represents a divalent linking group and $Rf_{13}$ represents a fluorine-containing alkyl group having 1 to 20 carbon atoms.

(MA) represents a unit including at least one of a group having an unsaturated double bond and a ring-opening polymerizable group.

(MB) represents an uncrosslinkable unit.

(MC) represents a unit obtained by polymerizing a monomer having at least one polyalkylene oxide group represented by formula (2).

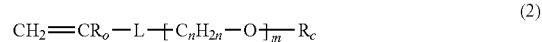

In formula (2), Ro represents a hydrogen atom, a halogen atom or a methyl group. L represents a divalent linking group, Rc represents a hydrogen atom or an alkyl group having 1 to 10 carbon atoms, m represents an integer of 2 to 50, n represents an integer of 1 to 5. When m is two or more, a plurality of "—($C_nH_2n$-O)—" may be different.

(MD) represents a unit containing at least one polysiloxane structure.

Examples of the fluorine-containing polymer include a polymer having a fluorine-containing hydrocarbon structure such as a group containing a fluorine-containing hydrocarbon and a monomer unit containing a fluorine-containing hydrocarbon (i.e., a unit obtained from a monomer containing a fluorine-containing hydrocarbon).

Examples of the fluorine-containing hydrocarbon structure include a fluorine-containing aliphatic hydrocarbon group, a fluorine-containing aromatic hydrocarbon group, a monomer unit containing a fluorine-containing aliphatic hydrocarbon group, and a monomer unit containing a fluorine-containing aromatic hydrocarbon group. Among them, a fluorine-containing aliphatic hydrocarbon group or a monomer containing a fluorine-containing aliphatic hydrocarbon group is preferable.

A molecular weight of the fluorine-containing hydrocarbon structure is preferably 500 to 100000, more preferably 1000 to 80000, and further preferably 2000 to 50000. For control of the molecular weight of the fluorine-containing hydrocarbon, in a case of a monomer containing a fluorine-containing hydrocarbon, the control is easily performed by varying polymerization degree of a fluorine-containing vinyl monomer, which is preferable. Examples of a fluorine-containing vinyl monomer include fluoroolefines (fluoroethylene, vinylidene fluoride, tetrafluoroethylene, perfluorooctylethylene, hexafluoropropylene, and the like), alkylester derivatives in which a (meth)acrylic acid is partially or completely fluorinated such as Viscoat 6FM (manufactured by OSAKA ORGANIC CHEMICAL INDUSTRY LTD.) and M-2020 (DAIKIN INDUSTRIES), a partially or completely fluorinated vinyl ethers, and the like.

The component (B) may be singly used, or a plurality of the components (B) is used in combination.

<Synthesis Method of Component (B)>

A preferable embodiment of a synthesis method of the component (B) will be described below.

A preferable embodiment of a synthesis method of the component (B) is a synthesis method in which a polymerizable polyalkylene oxide compound (Y) (also referred to as "component (Y)") having an unsaturated double bond and represented by formula (2) and a polymerizable compound (Z) containing an unsaturated double bond having a fluorine-containing hydrocarbon structure.

—(Y) Compound Represented by Formula (2)—

In a compound represented by formula (2) which is the component (Y), n is preferably 2 to 4 ($2 \leq n \leq 4$), and more preferably 2 to 3 (2≤n≤3) in order to obtain a sufficient interaction with an inorganic fine particle and a sufficient solubility into a solvent for preparing a composition for application. M is preferably 3 to 20 (3≤n≤20), and further preferably 5 to 10 (5≤n≤10).

Ro represents a hydrogen atom, a halogen atom or a methyl group, and preferably a hydrogen atom or a methyl group.

Rc represents a hydrogen atom or an alkyl group having 1 to 10 carbon atom. In an alkyl group, an alkyl group having 1 to 6 carbon atoms is preferable.

L represents a divalent linking group, and preferable, an alkylene group having 1 to 10 carbon atoms, an arylene group having 6 to 10 carbon atoms, —O—, —S—, —N(R)—, —CO— and a combination thereof. Here, R represents a hydrogen atom or an alkyl group having 1 to 5 carbon atoms. L is preferably a divalent linking group having 1 to 9 carbon atoms, and more preferably a divalent linking group having 1 to 7 carbon atoms from the viewpoints of low steric hindrance and not obstructing an interaction with an inorganic fine particle. L is particularly preferably —COO—, —CONH—, —CO—S—, and most preferably —COO—.

Examples of the component (Y) in an exemplary embodiment of the present invention include, as a monomer, methoxypolyethylene glycol (meth)acrylate, (methoxypolyethylene glycol) (meth)acrylamide, methoxypoly(propylene-block-ethylene)glycol (meth)acrylate, (methoxypoly(propylene-block-ethylene glycol) (meth)acrylamide, ethoxypolyethylene glycol (meth)acrylate, (ethoxypolyethylene glycol) (meth)acrylamide, ethoxypoly(propylene-block-ethylene) glycol (meth)acrylate, (ethoxypoly(propylene-block-ethylene)glycol) (meth)acrylamide, and the like. An entire length of a side chain of polyalkylene glycol is preferably set to be an average molecular weight of the side chain of 30 to 4300 g/mol, preferably 132 to 1440 g/mol, and more preferably 220 to 580 g/mol. Of the above monomers, methoxypolyalkylene glycol (meth)acrylate having a number average molecular weight of preferably 100 to 4500, more preferably 200 to 1600, and further preferably 300 to 700. Specific examples thereof includes BLENMER PE-20, PE-200, PE-350, PME-100, PME-200, PME-400, AE-350 (manufactured by NOF CORPORATION), MA-30, MA-50, MA-100, MA-150, RA-1120, RA-2314, RMA-564, RMA-568, RMA-1114, MPG-130-MA (manufactured by Nippon Nyukazai Co., Ltd.), and the like. Also, the component (Y) may be obtained by reacting commercially available hydroxypoly(oxyalkylene) material such as trade name "Pluronic" manufactured by ADEKA CORPORATION, "ADEKA Polyether" manufactured by ADEKA CORPORATION, "Carbowax" manufactured by GLICO PRODUCTS, "Toriton" manufactured by Rohm and Hass and "P.E.G" manufactured by DAI=ICHI KOGYO SEIYAKU CO., LTD. with an acrylic acid, a methacrylic acid, an acrylchloride, a methacrylchloride, an acrylic anhydride, or the like by using a conventional method. The above exemplified monomer may be used singly, and two or more kinds may be used in combination.

Examples of the polymerizable polyalkyleneoxy compound having an unsaturated double bond and represented by formula (2), which is the component (Y) are shown below. However, the component (Y) is not limited by them. The number of a repeating unit of an alkyleneoxy group represents an integer closest to an average value in a mass average.

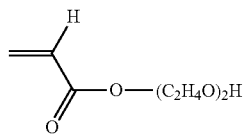
A-1

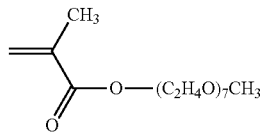
A-2

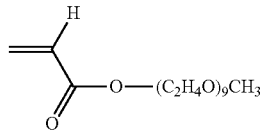
A-3

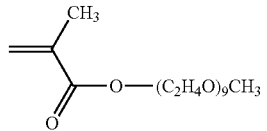
A-4

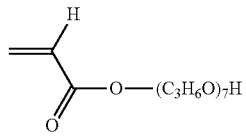
A-5

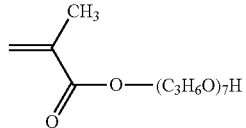
A-6

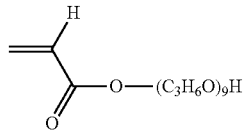
A-7

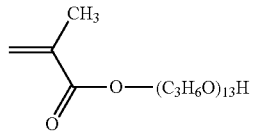
A-8

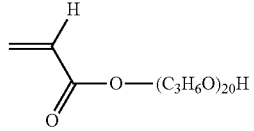
A-9

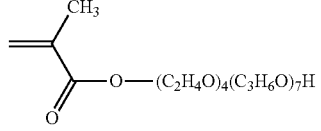
A-10

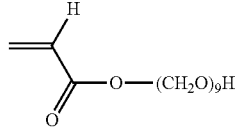
A-11

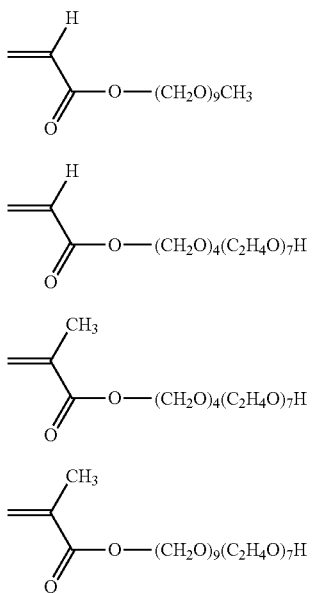

—(Z) Component Containing a Polymerizable Fluorine-containing Hydrocarbon Compound having Unsaturated Double Bond—

In an exemplary embodiment of the present invention, a component (Z) containing a polymerizable fluorine-containing hydrocarbon compound having an unsaturated double bond (also referred to as "component (X)") may be used to obtain the component (B) by reacting with the component (Y).

Examples of the component (Z) include a monomer of a fluorine-containing hydrocarbon having an unsaturated double bond.

The monomer of a fluorine-containing hydrocarbon having an unsaturated double bond includes compounds represented by formulae (1-1), (1-2) and (1-3) to be described later, and the like.

A weight average molecular weight of the component (B) is preferably 1000 to 100000, more preferably 2000 to 50000, and further preferably 3000 to 30000.

Here, a weight average molecular weight may be measured by using GPC analyzer equipped with TSKgel GMHxL, TSKgel G4000HxL, or TSK gel G2000HxL (all manufactured by TOSOH CORPORATION) as a molecular weight in term of polystyrene under conditions of solvent (tetrahydrofuran) and refractive index detection.

The component (B) of an exemplary embodiment of the present invention may be manufactured by a conventional method. For example, the component (B) may be manufactured by polymerizing monomers of a fluorine-containing hydrocarbon having an unsaturated double bond in an organic solvent in which a common radical initiator is added. Depending on components, another addition polymerizable unsaturated compound is further added and the above manner may be performed. A dropwise polymerization in which a polymerization is carried out while adding dropwise a monomer and an initiator into a reaction vessel or the like is effective for obtaining a polymer having uniform composition.

The component (B) of an exemplary embodiment in the present invention is preferably a copolymer containing a polymerization unit having a fluorine-containing hydrocarbon structure, and having a polyalkylene oxide group in a molecular, from the viewpoint of facility of synthesis and excellent compatibility with a curable material having a low refractive index contained in an application composition in a case of using the curable material.

The fluorine-containing polymer represented by formula (1) may be a random copolymer and a block copolymer.

Monomers (compounds represented by formulae (1-1) to (1-3)) in (MF1) to (MF3) of formula (1) will be described below.

(MF1): $CF_2\!=\!CF\!-\!Rf_1$     formula (1-1)

In formula (1-1), $Rf_1$ represents a perfluoroalkyl group having 1 to 5 carbon atoms. The compounds represented by formula (1-1) is preferably perfluoropropylene or perfluorobutylene from the viewpoint of polymerization reactivity, and particularly preferably perfluoropropylene from the viewpoint of availability.

(MF2): $CF_2\!=\!CF\!-\!ORf_{12}$     formula (1-2)

In formula (1-2), $Rf_{12}$ represents a fluorine-containing alkyl group having 1 to 30 carbon atoms which may have a substituent. Further, $Rf_{12}$ may have —O— in —C—C— bond.

$Rf_{12}$ is preferably a fluorine-containing alkyl group having 1 to 20 carbon atoms, more preferably a fluorine-containing alkyl group having 1 to 10 carbon atoms. Further, $Rf_{12}$ is preferably a perfluoroalkyl group having 1 to 10 carbon atoms. Examples of $Rf_{12}$ are show below, but are not limited thereto.

—$CF_3$, —$CF_2CF_3$, —$CF_2CF_2CF_3$, —$CF_2CF(OCF_2CF_2CF_3)CF_3$ (MF3): $CH_2\!=\!CRo\text{-}L\text{-}Rf_{13}$     formula (1-3)

In formula (1-3), Ro represents a hydrogen atom, a halogen atom or a methyl group, L represents a divalent linking group, $Rf_{13}$ represents a fluorine-containing alkyl group having 1 to 20 carbon atoms.

$Rf_{13}$ is preferably a fluorine-containing alkyl group having 1 to 15 carbon atoms, and may be a straight chain (for example, —$CF_2CF_3$, —$CH_2(CF_2)_4H$, —$CH_2(CF_2)_8CF_3$, —$CH_2CH_2(CF_2)_4H$, and the like), a branched chain (for example, —$CH(CF_3)_2$, —$CH_2CF(CF_3)_2$, —$CH(CH_3)CF_2CF_3$, —$CH(CH_3)(CF_2)_5CF_2H$, and the like), or an alicyclic structure (preferably, 5-membered or 6-membered ring, for example, a perfluorocyclohexyl group, a perfluorocyclopentyl group, an alkyl group substituted by a perfluorocyclohexyl group or a perfluorocyclopentyl group, and the like).

(MF3) is preferably a unit obtained by polymerizing a monomer represented by formula (1-3-1) or (1-3-2) below.

$CH_2\!=\!CR_0\text{-}L\text{-}(CH_2)_{n1}(CF_2)_{n2}H$     (1-3-1)

In formula (1-3-1), Ro represents a hydrogen atom, a halogen atom or a methyl group, L represents a divalent linking group, n1 represents an integer of 0 to 20, and n2 represents an integer of 1 to 30.

$CH_2\!=\!CR_0\text{-}L\text{-}(CH_2)_{n3}(CF_2)_{n4}F$     (1-3-2)

In formula (1-3-2), Ro represents a hydrogen atom, a halogen atom or a methyl group, L represents a divalent linking group, n3 represents an integer of 0 to 20 and n4 represents an integer of 1 to 30.

Preferable range of Ro and L in formulae (1-3-1) and (1-3-2) is the same as the range of formula (2). n1 is preferably an integer of 1 to 10, and more preferably an integer of 1 to 6. n2 is preferably an integer of 1 to 25, and more preferably an integer of 1 to 18. n3 is preferably an integer of 1 to 10, and more preferably an integer of 1 to 6. n4 is preferably an integer of 1 to 20, and more preferably an integer of 2 to 15.

Specific examples of the compounds represented by formula (1-3-1) or (1-3-2) available for (MF3) will be shown below. However, a compound used as (MF3) is not limited thereto.

$$CH_2=CR_0-L-(CH_2)_{n1}(CF_2)_{n2}H \quad (1-3-1)$$

| | $R_0$ | L | $n_1$ | $n_2$ |
|---|---|---|---|---|
| MF3-1 | H | COO | 1 | 4 |
| MF3-2 | CH3 | COO | 1 | 4 |
| MF3-3 | H | COO | 1 | 6 |
| MF3-4 | CH3 | COO | 1 | 6 |
| MF3-5 | H | COO | 1 | 8 |
| MF3-6 | CH3 | COO | 1 | 8 |
| MF3-7 | H | COO | 1 | 10 |
| MF3-8 | CH3 | COO | 1 | 10 |
| MF3-9 | H | COO | 1 | 12 |
| MF3-10 | CH3 | COO | 1 | 12 |
| MF3-11 | H | COO | 1 | 14 |
| MF3-12 | CH3 | COO | 1 | 14 |
| MF3-13 | H | COO | 1 | 16 |
| MF3-14 | CH3 | COO | 1 | 16 |
| MF3-15 | H | COO | 1 | 18 |
| MF3-16 | CH3 | COO | 1 | 18 |
| MF3-17 | H | COO | 2 | 8 |
| MF3-18 | CH3 | COO | 2 | 8 |
| MF3-19 | CH3 | COO | 3 | 8 |
| MF3-20 | F | COO | 1 | 8 |
| MF3-21 | H | CONH | 1 | 8 |
| MF3-22 | CH3 | CONH | 1 | 8 |
| MF3-23 | H | CO—S— | 1 | 8 |
| MF3-24 | CH3 | CO—S— | 1 | 8 |

$$CH_2=CR_0-L-(CH_2)_{n3}(CF_2)_{n4}F \quad (1-3-2)$$

| | $R_0$ | L | $n_3$ | $n_4$ |
|---|---|---|---|---|
| MF3-25 | H | COO | 1 | 4 |
| MF3-26 | CH3 | COO | 1 | 4 |
| MF3-27 | H | COO | 1 | 7 |
| MF3-28 | CH3 | COO | 1 | 7 |
| MF3-29 | H | COO | 1 | 10 |
| MF3-30 | CH3 | COO | 1 | 10 |
| MF3-31 | H | COO | 2 | 8 |
| MF3-32 | CH3 | COO | 2 | 8 |
| MF3-33 | H | CONH | 2 | 4 |
| MF3-34 | CH3 | CONH | 2 | 4 |
| MF3-35 | H | CONH | 2 | 6 |
| MF3-36 | CH3 | CONH | 2 | 6 |
| MF3-37 | H | CO—S— | 2 | 6 |
| MF3-38 | CH3 | CO—S— | 2 | 6 |

(MA) in formula (1) represents a unit including at least one of a group having an unsaturated double bond and an opening ring polymerization reactive group. From the viewpoint of enhancement of strength of film formed by using an application composition in an exemplary embodiment of the present invention, the fluorine-containing polymer which is the component (A) preferably contains a repeating unit having such a reactive group in a molecular of the polymer.

Preferable specific examples of the unit represented by (MA) in formula (1) are shown below. However, the present invention is not limited thereto.

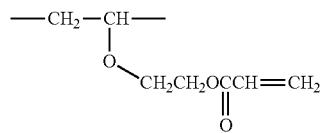

MA-1

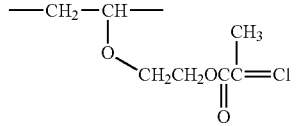

MA-2

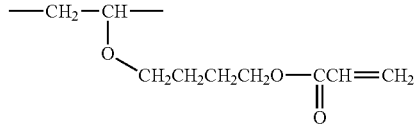

MA-3

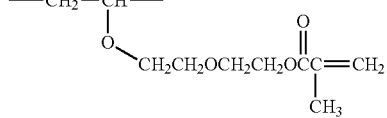

MA-4

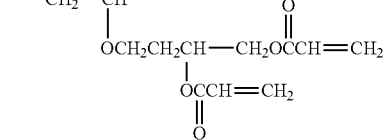

MA-5

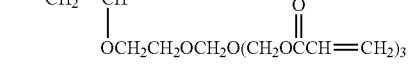

MA-6

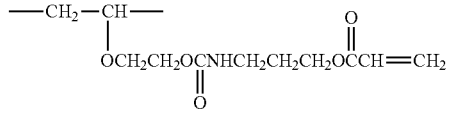

MA-7

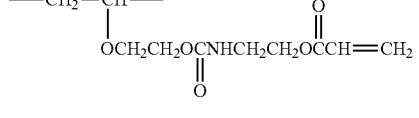

MA-8

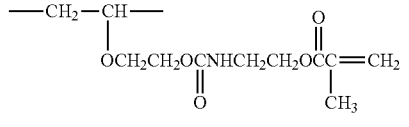

MA-9

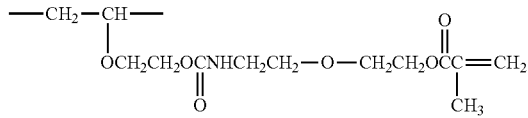

MA-10

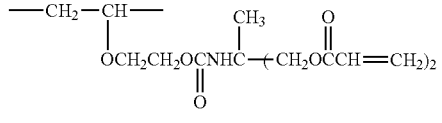

MA-11

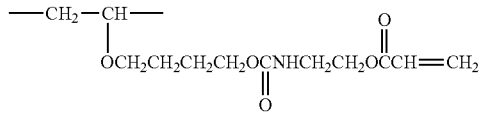

MA-12

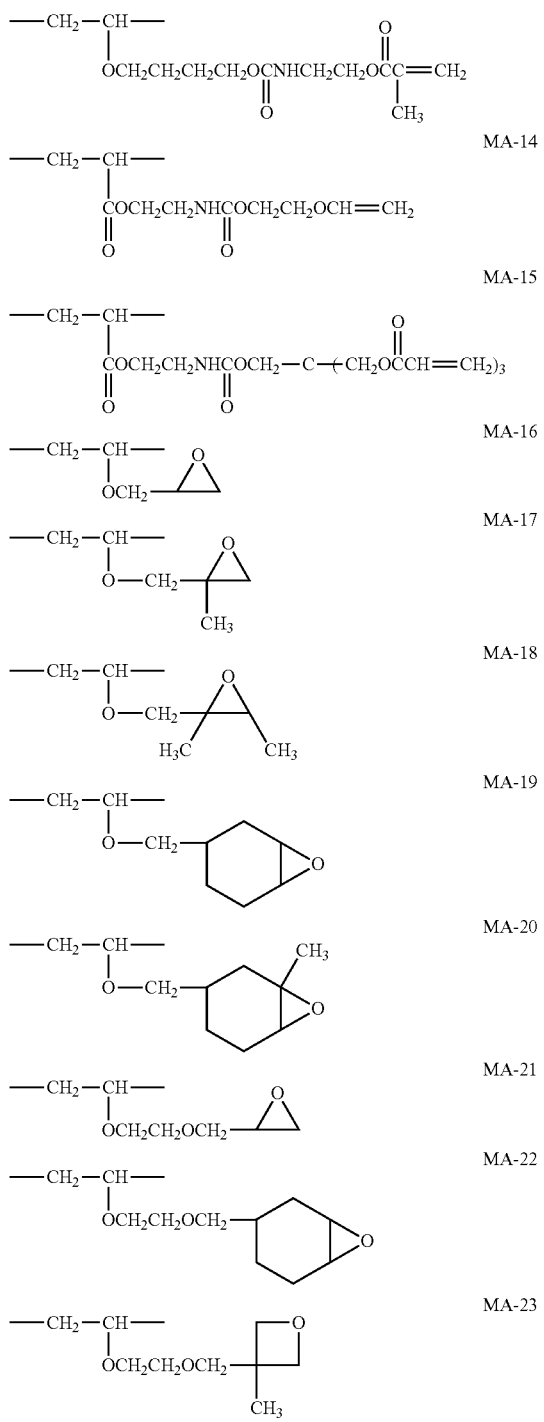

(MB) in formula (1) represents an uncrosslinkable unit. The uncrosslinkable unit means that a component after a fluorine-containing polymer is formed by copolymerizing such a unit with other components constituting the fluorine-containing polymer is uncrosslinkable. (MB) may be appropriately selected from the viewpoints of stability of an application composition, solubility into a solvent, affinity to an inorganic fine particle, dispersion stability of the inorganic fine particle, and the like, for preventing a three-dimensional network structure from being formed due to dehydration condensation reaction, hydrolysis reaction, or the like.

Examples of a monomer for forming (MB) include: vinyl ethers such as methylvinyl ether, ethylvinyl ether, n-butylvinyl ether, cyclohexylvinyl ether and isopropylvinyl ether; vinyl esters such as vinyl acetate, vinyl propionate, vinyl butyrate and vinyl cyclohexanecarboxylate; and (meth)acrylate such as methyl (meth)acrylate and ethyl (meth)acrylate.

(MD) in formula (1) represents a unit having at least one polysiloxane structure. Due to incorporation of the polysiloxane structure, inorganic particles of an exemplary embodiment in the present invention tend to be locally distributed at an upper side. Further, it is possible to reduce inorganic particles present at an underlayer in extremely small amount which are a factor of planar failure.

Thus, the component (A) preferably contains, in a molecular, the fluorine-containing hydrocarbon unit and a polysiloxane unit. More specifically, (MD) preferably contains a polysiloxane repeating unit represented by formula (20) at the main chain or a side chain.

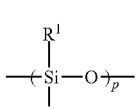

Formula (20)

In formula (20), $R^1$ and $R^2$ each independently represent an alkyl group or an aryl group.

In an alkyl group, an alkyl group having 1 to 4 carbon atoms is preferable and an alkyl group may have a substituent. Specifically, a methyl group, a trifluoroethyl group, an ethyl group, and the like are exemplified.

In an aryl group, an aryl group having 6 to 20 carbon atoms is preferable and an aryl group may have a substituent. Specifically, a phenyl group, a naphthyl group, and the like are exemplified.

$R^1$ and $R^2$ are preferably a methyl group or a phenyl group, and more preferably a methyl group.

p represents an integer of 2 to 500, preferably an integer of 5 to 350, and more preferably an integer of 8 to 250.

A polymer including the polysiloxane structure represented by formula (20) at a side chain may be synthesized by a method of polymerizing silicone macromers containing a polysiloxane. Also, the polymer may be obtained by introducing a polysiloxane (Silaplane series, manufactured by CHISSO CORPORATION) having a reactive group (for example, an epoxy group, an amino group to an acid anhydride group, a mercapto group, a carboxyl group, a hydroxyl group, or the like) at one terminal into a polymer containing a reactive group such as an epoxy group, a hydroxyl group, a carboxyl group and an acid anhydride group with the reactive group of the polysiloxane in a polymer reaction in accordance with, for example, J. Appl. Polym. Sci. 2000, 78, 1955, JP-A-56-28219 and the like.

A polymer containing a polysiloxane structure at the main chain may be synthesized by: a method of using a polymer-type initiator such as a polysiloxane amide (commercially available, for example, VPS-0501, 1001, manufactured by Wako Pure Chemical Industries, Ltd.) containing an azo group as described in, for example, JP-A-H06-93100; a method of introducing a reactive group (for example, a mercapto group, a carboxyl group, a hydroxyl group, or the like) derived from a polymerizable initiator or a chaintransfer agent into at the end of the polymer, and then copolymerizing a cyclic siloxane oligomer such as hexamethylcyclotrisiloxane in an anionic ring-opening polymerization for reacting the polymer with a polysiloxane containing a one terminal-reactive group or a both-terminals-reactive group (for example, an epoxy group, an isocyanate group, or the like); and the like. Among them, a method of using an initiator having a polysiloxane partial structure is simple and preferable.

In formula (1), a to f represents a molar ratio of each unit, and g represents a mass ratio (mass %) in the fluorine-containing polymer. Also, a to g represents the following relationships.

0≤a≤70, 0≤b≤70, 0≤c≤80, 30≤a+b+c≤90, 1≤d≤50, 0≤e≤50, 0≤f≤50 and 0≤g≤15

By enhancing a molar ratio (%) of the (MF1) components, (MF2) component, and (MF3) component, which is represented by a+b+c, surface free energy of the polymer is lowered and an inorganic fine particle modified with the polymer tends to be locally distributed in the island part. From the viewpoints of absorption property to the inorganic fine particle, solubility into a common solvent, or the like, a+b+c is preferably 30 to 90 (30≤a+b+c≤90), and more preferably 40 to 80 (40≤a+b+c≤80).

Introduction of (MF1) contributes local distribution of the inorganic fine particle in the island part. As previously mentioned, a molar ratio α of (MF1) is 0 to 70 (0≤a≤70), and preferably 5 to 40 (5≤a≤40).

Introduction of (MF2) also contributes local distribution of the inorganic fine particle in the island part. As previously mentioned, a molar ratio b of (MF1) is 0 to 70 (0≤b≤70), and preferably 5 to 40 (5≤b≤40).

Introduction of (MF3) also contributes local distribution of the inorganic fine particle in the island part. As previously mentioned, a molar ratio c of (MF1) is 0 to 80 (0≤c≤80), and preferably 5 to 40 (5≤c≤40).

The component containing at least one polyalkylene oxide group represented by (MC) has a molar ratio f of 0 to 50 (0≤f≤50), more preferably 0.5 to 40 (0≤f≤50), and more preferably 1 to 30 (1≤f≤30) in order that coatability of the polymer with the inorganic fine particle is sufficient and an amount of the fluorine-containing component which is necessary for local distribution of the inorganic fine particle in the island part may be kept. Also, when solubility into an application solvent is sufficiently high due to a composition of the monomer of the fluorine-containing copolymer at forming a copolymer, a ratio f of the monomer having a polyalkylene oxide group may be high, preferably 6 to 40 ((6≤f≤40)). L and Ro in the (MC) component in formula (2) may be same as or different from L and Ro in the (MF3).

A unit including at least one of an unsaturated double bond represented by (MA) and a ring-opening polymerizable group is preferably introduced into the polymer from the viewpoint of improvement of hardness of a film to be formed. In an exemplary embodiment of the present invention, the component (A) preferably contains a polymerizable functional group in a molecular. Thus, the lower limit of a preferable range of d is 5, and d is preferably 5 to 40 (5≤d≤40), and more preferably 5 to 30 (5≤d≤30).

A molar ratio e of a unit including an uncrosslinkable group represented by (MB) is preferably 0 to 50 (0≤e≤50), more preferably 0 to 20 (0≤e≤20), and further preferably 0 to 10 (0≤e≤10).

(MC) represents a unit obtained by polymerizing a monomer having at least one polyalkylene oxide group represented by formula (2). A preferable range of formula (2) in (MC) is the same as the above.

Introduction of a polysiloxane structure represented by (MD) is preferable from the viewpoint of improvement of local distribution of the inorganic fine particle in the island part and a surface state of a film to be formed. A content of a polysiloxane structure in the fluorine-containing polymer is preferably 0.5 to 15 mass %, and more preferably 1 to 10 mass % with respect to the entire amount of the polymer.

A weight average molecular weight of the fluorine-containing polymer is preferably 1000 to 100000, more preferably 2000 to 50000, and further preferably 3000 to 30000.

Here, a weight average molecular weight may be measured by using GPC analyzer equipped with TSKgel GMHxL, TSKgel G4000HxL, or TSK gel G2000HxL (all manufactured by TOSOH CORPORATION) as a molecular weight in term of polystyrene under conditions of solvent (tetrahydrofuran) and refractive index detection.

Hereinafter, specific compounds of the fluorine containing copolymer represented by formula (1), which is the component (B) of an exemplary embodiment in the present invention, will be shown below. However, the present invention is not limited thereto. Also, Table 1 includes a combination of monomers for constituting (MF1), (MF2), (MF3), (MC), (MA), (MB), or (MD) in formula (1) by polymerization. In table 1, a to f represents a molar ratio of monomer of each component. In table 1, an expression including "wt %" represents a mass ratio (mass %) of the component in the mass of the total polymers.

TABLE 1

| | (MF-1) | (MF-2) | (MF-3) | (MC) | (MA) | (MB) | (MD) | a | b | c | f | d | e | g | Weight average molecular weight |
|---|---|---|---|---|---|---|---|---|---|---|---|---|---|---|---|
| IPF-2 | HFP | — | — | A-3 | (MA-8) | EVE | — | 50 | — | — | 5 | 25 | 20 | — | 23000 |
| IPF-3 | HFP | — | — | A-3 | (MA-8) | EVE | VPS-1001 | 50 | — | — | 5 | 25 | 20 | 2 wt % | 24000 |
| IPF-4 | HFP | FPVE | — | A-3 | (MA-8) | EVE | VPS-1001 | 45 | 5 | — | 5 | 25 | 20 | 2 wt % | 23000 |
| IPF-5 | HFP | FPVE | MF3-3 | A-3 | (MA-8) | EVE | — | 45 | 5 | 5 | 5 | 25 | 15 | — | 22000 |
| IPF-6 | HFP | — | — | A-3 | (MA-8) | EVE | FM-0721 | 50 | — | — | 5 | 25 | 20 | 2 wt % | 23000 |
| IPF-7 | HFP | — | — | A-3 | (MA-12) | EVE | FM-0721 | 50 | — | — | 5 | 25 | 20 | 3 wt % | 25000 |
| IPF-8 | HFP | FPVE | — | A-3 | (MA-12) | EVE | FM-0721 | 45 | 5 | — | 5 | 25 | 20 | 2 wt % | 24000 |
| IPF-9 | HFP | — | — | A-5 | (MA-8) | EVE | VPS-1001 | 50 | — | — | 5 | 25 | 20 | 2 wt % | 26000 |
| IPF-10 | HFP | FPVE | — | A-5 | (MA-8) | EVE | VPS-1001 | 45 | 5 | — | 5 | 25 | 20 | 2 wt % | 27000 |
| IPF-20 | — | — | MF3-3 | A-4 | (MA-15) | EVE | — | — | — | 60 | 8 | 12 | 20 | — | 20000 |
| IPF-21 | — | — | MF3-3 | A-4 | (MA-15) | EVE | VPS-1001 | — | — | 60 | 8 | 12 | 20 | 2 wt % | 25000 |
| IPF-22 | — | — | MF3-3 | A-4 | (MA-15) | EVE | FM-0721 | — | — | 60 | 8 | 12 | 20 | 2 wt % | 22000 |
| IPF-23 | — | — | MF3-3 | A-4 | (MA-14) | EVE | VPS-1001 | — | — | 60 | 8 | 12 | 20 | 2 wt % | 23000 |
| IPF-24 | — | FPVE | MF3-3 | A-4 | (MA-15) | EVE | VPS-1001 | — | 5 | 55 | 8 | 12 | 20 | 2 wt % | 23000 |
| IPF-25 | — | — | MF3-3 | A-3 | (MA-21) | EVE | FM-0721 | — | — | 60 | 8 | 22 | 10 | 2 wt % | 26000 |

TABLE 1-continued

| | (MF-1) | (MF-2) | (MF-3) | (MC) | (MA) | (MB) | (MD) | a | b | c | f | d | e | g | Weight average molecular weight |
|---|---|---|---|---|---|---|---|---|---|---|---|---|---|---|---|
| IPF-26 | — | — | MF3-3 | A-3 | (MA-22) | EVE | FM-0721 | — | — | 60 | 8 | 22 | 10 | 2 wt % | 25000 |
| IPF-27 | — | — | MF3-3 | A-10 | (MA-21) | EVE | FM-0721 | — | — | 60 | 8 | 22 | 10 | 2 wt % | 21000 |
| IPF-28 | — | — | MF3-6 | A-3 | (MA-8) | EVE | — | — | — | 60 | 10 | 10 | 20 | — | 18000 |
| IPF-29 | — | — | MF3-6 | A-3 | (MA-8) | EVE | — | — | — | 60 | 10 | 10 | 20 | — | 19000 |
| IPF-30 | — | — | MF3-6 | A-8 | (MA-8) | EVE | VPS-1001 | — | — | 60 | 10 | 10 | 20 | 2 wt % | 23000 |
| IPF-31 | — | — | MF3-6 | A-4 | (MA-8) | EVE | FM-0721 | — | — | 60 | 10 | 10 | 20 | 2 wt % | 23000 |
| IPF-34 | HFP | FPVE | MF3-6 | A-4 | (MA-1) | EVE | FM-0721 | 50 | 5 | 5 | 10 | 10 | 20 | 2 wt % | 23000 |
| IPF-35 | HFP | FPVE | MF3-3 | A-4 | (MA-1) | EVE | VPS-1001 | 50 | 5 | 5 | 10 | 10 | 20 | 2 wt % | 22000 |
| IPF-36 | HFP | — | — | A-4 | (MA-1) | EVE | — | 50 | — | — | 10 | 10 | 30 | — | 24000 |

Abbreviations in table 1 represent the following.
HFP: Hexafluoropropylene
FPVE: Perfluoro propyl vinyl ether
EVE: Ethyl vinyl ether
VPS-1001: Polydimethylsiloxane containing an azo group (molecular weight of polysiloxane part: about 10000, manufactured by Wako Pure Chemical Industries, Ltd.)
FM-0721: Methacloyl-modified dimethylsiloxane (average molecular weight: 5000, manufactured by CHISSO CORPORATION)

<Fluorine-containing Polymer having No Polyalkylene Oxide Group in Molecule and Represented by Formula (3)>

$$(MF1)_a\text{-}(MF2)_b\text{-}(MF3)_c\text{-}(MA')_d\text{-}(ME)_h \quad \text{formula (3)}$$

In formula (3), a to d and h each represent a molar ratio of each composition and satisfy the following relationships.

$0 \leq a \leq 70$, $0 \leq b \leq 70$, $30 \leq a+b \leq 70$, $0 \leq c \leq 50$, $5 \leq d \leq 50$, $0 \leq h \leq 50$ (MF1) represents a unit obtained by polymerizing a monomer represented by "$CF_2=CF-Rf_1$", wherein $Rf_1$ represents a perfluoroalkyl group having 1 to 5 carbon atoms.

(MF2) represents a unit obtained by polymerizing a monomer represented by "$CF_2=CF-ORf_{12}$", wherein $Rf_{12}$ represents a fluorine-containing alkyl group having 1 to 30 carbon atoms.

(MF3) represents a unit obtained by polymerizing a monomer represented by "$CH_2=CRo-L-Rf_{13}$", wherein Ro represents a hydrogen atom, a halogen atom or a methyl group, L represents a divalent linking group and $Rf_{13}$ represents a fluorine-containing alkyl group having 1 to 20 carbon atoms.

(MA') represents a unit having at least one crosslinkable group.

(ME) represents an arbitrary unit.

The above (MF1) to (MF3) are the same as (MF1) to (MF3) explained in the fluorine-containing polymer represented by formula (1), and preferable structure and the like is also the same.

It is essential that the fluorine-containing polymer represented by formula (3) includes a repeating unit having a crosslinkable portion, and the crosslinkable portion is preferably a group having a reactive unsaturated double bond, an open-ring polymerization reactive group, a group having an active hydrogen atom, a group capable of being substituted by nucleophile or an acid anhydride.

(MA') in formula (3) represents a unit having at least one crosslinkable portion (reactive portion capable of contributing to a crosslinking reaction).

Examples of the crosslinkable portion include a group having a reactive unsaturated double bond (a (meth)acryloyl group, an allyl group, a vinyloxy group, or the like), an open-ring polymerization reactive group (an epoxy group, an oxetanyl group, an oxazole group, or the like), a group having an active hydrogen atom (for example, a hydroxyl group, a carboxyl group, an amino group, a carbamoyl group, a mercapto group, a β-ketoester group, a hydrosilyl group, or the like), an acid anhydride, a group capable of being substituted by nucleophile (an active halogen atom, a sulfonate, or the like), and the like.

The crosslinkable group of (MA') is preferably a polymerizable group, and more preferably a group having a reactive unsaturated double bond or an open-ring polymerization reactive group, and further preferably a group having a reactive unsaturated double bond. Preferable specific examples of the unit represented by (MA') are MA-1 to MA-23 in formula (1). The followings are other preferable unit of (MA') than MA-1 to MA-23, but the present invention is not limited thereto.

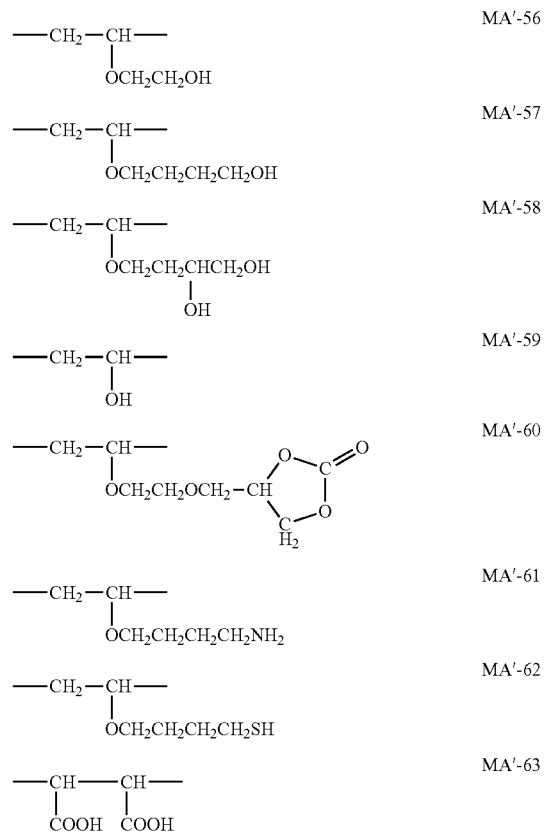

MA'-64

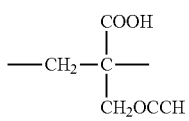

MA'-65

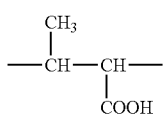

MA'-66

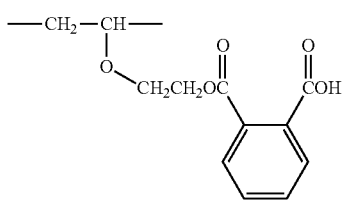

MA'-67

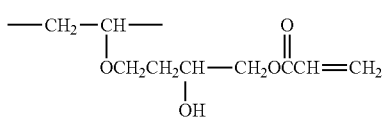

MA'-68

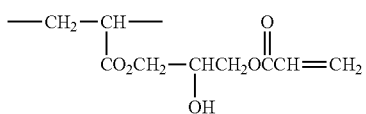

MA'-69

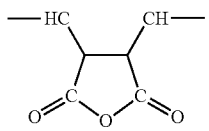

MA'-70

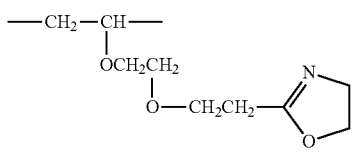

(ME) in formula (3) represents an arbitrary unit. (ME) is not particularly limited unless (ME) is a unit obtained from a monomer capable of be copolymerized with a monomer constituting any units of (MF1), (MF2) and (MF3) and a monomer constituting the unit of (MA), and may be appropriately selected from the viewpoints of adhesion property to a substrate, Tg of the polymer (contributing to hardness of a film), solubility into a solvent, transparency, slippage, dust resistance/antifouling property, or the like.

Examples of a monomer for forming (ME) include: vinyl ethers such as methyl vinyl ether, ethyl vinyl ether, n-butyl vinyl ether, cyclohexyl vinyl ether and isopropyl vinyl ether; vinyl esters such as vinyl acetate, vinyl propionate, vinyl butylate and vinyl cyclohexanecarboxylate; and the like.

(ME) preferably contains a unit having a polysiloxane structure. By containing a polysiloxane structure in (ME), local distribution at the upper side of a film tends to be occurred, and a film to be obtained has a low reflection index and improved surface state. Also, due to a polysiloxane structure, slippage and antifouling property of a laminate may be improved.

As a method for introducing a polysiloxane structure, a similar method to that explained in formula (1) may be adopted.

In formula (3), a to d and h each represent a molar ratio of each composition and satisfy the following relationships.

$0 \leq a \leq 70$, $0 \leq b \leq 70$, $30 \leq a+b \leq 70$, $0 \leq c \leq 50$, $5 \leq d \leq 50$, $0 \leq h \leq 50$ In order to lower a reflection index, it is desired that a molar ratio (%) of the (MF1) and (MF2) components (i.e., a+b) becomes large. However, from the viewpoint of polymerization reaction, a range of about 50 to 70% is the upper limit in a general radical polymerization in solution system, and further introduction is generally difficult. In an exemplary embodiment of the present invention, the lower limit of a+b is preferably 40 or more, and more preferably 45 or more.

Introduction of (MF3) contributes to lowering a reflection index. As previously mentioned, a molar ratio c of (MF3) is 0 to 50 ($0 \leq c \leq 50$), and more preferably 5 to 20 ($5 \leq c \leq 20$).

The sum of molar ratios of a to c (fluorine-containing monomer) is preferably 40 to 90 ($40 \leq a+b+c \leq 90$), and more preferably 50 to 75 ($50 \leq a+b+c \leq 75$).

When a ratio of the unit represented by (MA') is too small, strength of a cured film is low. In an exemplary embodiment of the present invention, a molar ratio d of (MA') is preferably 5 to 40 ($5 \leq d \leq 40$), and more preferably 5 to 30 ($5 \leq d \leq 30$).

A molar ratio h of an arbitrary unit represented by (ME) is preferably 0 to 50 ($0 \leq h \leq 50$), more preferably 0 to 20 ($0 \leq h \leq 20$), and further preferably 0 to 10 ($0 \leq h \leq 10$).

In an exemplary embodiment of the present invention, the fluorine-containing polymer represented by formula (3) preferably contains a functional group with high polarity in a molecular from the viewpoint of improvement of surface state of a film and scratch resistance of a film. Accordingly, (ME) preferably contains a functional group with high polarity in a molecular. Examples of a functional group with high polarity include a hydroxyl group, an alkyl ether group, a glycidyl group, an oxetanyl group, a carboxyl group, and preferably a hydroxyl group and an alkyl ether group.

An amount of a polymerizable unit containing these functional groups is 0.1 to 15% by mole, and more preferably 1 to 10% by mole.

As previously mentioned, the fluorine-containing polymer is preferably introduced with a polysiloxane structure from the viewpoints of improvement of surface state of a film and scratch resistance of a film.

An amount of the polysiloxane structure in the fluorine-containing polymer is 0.5 to 15 mass %, and more preferably 1 to 10 mass %, based on the mass of the total polymers.

A number average molecular weight of the fluorine-containing polymer is preferably 1000 to 1000000, more preferably 5000 to 500000, and further preferably 10000 to 100000.

Hereinafter, specific examples of the copolymer represented by formula (3), but the present invention is not limited thereto. Also, table 2 includes a combination of monomers for constituting (MF1), (MF2), (MF3), (MA') or (ME) in formula (3) by polymerization. In table 2, a to d represents a molar ratio of monomer of each component. In table 2, an expression including "wt %" in (ME) represents a mass ratio (mass %) of the component in the mass of the total polymers. A ratio (wt %) of other components than EVE is described in the column "h" at the right side.

TABLE 2

| | (MF1) | (MF2) | (MF3) | (MA') | (ME) | a | b | c | d | h | Weight average molecular weight |
|---|---|---|---|---|---|---|---|---|---|---|---|
| P-1 | HFP | — | — | (MA-8) | EVE | 50 | — | — | 30 | 20 | 20000 |
| P-2 | HFP | — | — | (MA-8) | EVE/VPS-1001 | 50 | — | — | 30 | 20/2 wt % | 23000 |
| P-3 | HFP | FPVE | — | (MA-8) | EVE/VPS-1001 | 45 | 5 | — | 30 | 20/2 wt % | 22000 |
| P-4 | HFP | FPVE | — | (MA-8) | EVE/VPS-0501 | 45 | 5 | — | 30 | 20/2 wt % | 20000 |
| P-5 | HFP | FPVE | — | (MA-8) | EVE/FM-0721 | 45 | 5 | — | 30 | 20/2 wt % | 20000 |
| P-6 | HFP | FPVE | — | (MA-8) | EVE/FM-0725 | 45 | 5 | — | 30 | 20/2 wt % | 25000 |
| P-7 | HFP | FPVE | MF3-3 | (MA-8) | EVE/FM-0721 | 45 | 5 | 5 | 30 | 15/2 wt % | 20000 |
| P-8 | HFP | FPVE | — | (MA-9) | EVE/FM-0721 | 45 | 5 | — | 30 | 20/2 wt % | 20000 |
| P-9 | HFP | FPVE | — | (MA-8)/(MA'-56) | EVE/FM-0721 | 45 | 5 | — | 25/5 | 20/2 wt % | 19000 |
| P-10 | HFP | — | — | (MA-1) | EVE | 50 | — | — | 35 | 15 | 22000 |
| P-11 | HFP | — | — | (MA-1) | EVE/VPS-1001 | 50 | — | — | 35 | 15/2 wt % | 23000 |
| P-12 | HFP | FPVE | — | (MA-1) | EVE/VPS-1001 | 45 | 5 | — | 35 | 15/2 wt % | 21000 |
| P-13 | HFP | FPVE | — | (MA-1) | EVE/VPS-0501 | 45 | 5 | — | 35 | 15/2 wt % | 20000 |
| P-14 | HFP | FPVE | — | (MA-1) | EVE/FM-0721 | 45 | 5 | — | 35 | 15/2 wt % | 21000 |
| P-15 | HFP | FPVE | — | (MA-1) | EVE/FM-0725 | 45 | 5 | — | 35 | 15/2 wt % | 24000 |
| P-16 | HFP | FPVE | MF3-3 | (MA-1) | EVE/FM-0721 | 45 | 5 | 5 | 35 | 10/2 wt % | 20000 |
| P-17 | HFP | FPVE | — | (MA-2) | EVE/FM-0721 | 45 | 5 | — | 35 | 15/2 wt % | 22000 |
| P-18 | HFP | FPVE | — | (MA-1)/(MA'-56) | EVE/FM-0721 | 45 | 5 | — | 30/5 | 15/2 wt % | 20000 |
| P-19 | HFP | — | — | (MA'-56) | EVE | 50 | — | — | 25 | 25 | 26000 |
| P-20 | HFP | — | — | (MA'-56) | EVE/VPS-1001 | 50 | — | — | 25 | 25/2 wt % | 27000 |
| P-21 | HFP | FPVE | — | (MA'-56) | EVE/VPS-1001 | 45 | 5 | — | 25 | 25/2 wt % | 27000 |
| P-22 | HFP | FPVE | — | (MA'-56) | EVE/VPS-0501 | 45 | 5 | — | 25 | 25/2 wt % | 25000 |
| P-23 | HFP | FPVE | — | (MA'-56) | EVE/FM-0721 | 45 | 5 | — | 25 | 25/2 wt % | 25000 |
| P-24 | HFP | FPVE | — | (MA'-56) | EVE/FM-0725 | 45 | 5 | — | 25 | 25/2 wt % | 27000 |
| P-25 | HFP | FPVE | MF3-3 | (MA'-56) | EVE/FM-0721 | 40 | 5 | 5 | 25 | 25/2 wt % | 27000 |
| P-26 | HFP | FPVE | — | (MA'-57) | EVE/FM-0721 | 45 | 5 | — | 25 | 25/2 wt % | 26000 |
| P-27 | HFP | — | — | (MA-21) | EVE/FM-0721 | 50 | — | — | 30 | 20/2 wt % | 26000 |
| P-28 | HFP | — | — | (MA-22) | EVE/FM-0721 | 50 | — | — | 30 | 20/2 wt % | 24000 |

Abbreviations in table 2 represent the following.
HFP: Hexafluoropropylene
FPVE: Perfluoro propyl vinyl ether
EVE: Ethyl vinyl ether
VPS-1001: Polydimethylsiloxane containing an azo group (molecular weight of polysiloxane part: about 10000, manufactured by Wako Pure Chemical Industries, Ltd.)
FM-0721: Methacloyl-modified dimethylsiloxane (average molecular weight: 5000, manufactured by CHISSO CORPORATION)
FM-0725: One terminal methacloyl-modified dimethylsiloxane (average molecular weight: 10000, manufactured by CHISSO CORPORATION)
VPS-0501: Polydimethylsiloxane containing an azo group (molecular weight of polysiloxane part: about 5000, manufactured by Wako Pure Chemical Industries, Ltd.)
<(C) Polymerization Initiator>

The composition for forming an antireflection layer in the anti reflection film of an exemplary embodiment of the present invention preferably contains (C) polymerization initiator (also referred to as "component (C)").

The polymerization initiator is preferably a photopolymerization initiator.

Examples of a photopolymerization initiator include acetophenone, benzoin, benzophenone, phosphine oxide, ketal, anthraquinone, thioxanthone, azo compounds, peroxides, 2,3-dialkyldione compounds, disulfide compounds, fluoroamine compounds, aromatic sulfoniums, lophine dimmers, onium salts, borate salts, active esters, active halogen, inorganic complexes, coumarin, and the like. Specific examples, preferable embodiments, commercial available products, and the like, of the photopolymerization initiator are disclosed in [0133] to [0155] of JP-A-2009-098658, and they may be appropriately adopted in the present invention.

"Saishin UV-kouka gijutsu", edited by TECHNICAL INFORMATION INSTITUTE CO., LTD. (1991), p. 159, and "Shigaisen kouka system", author: Kiyomi Kato (1989), p. 65 to 148 also discloses various examples, and they may be applicable to the present invention.

An amount of the photopolymerization initiator in the composition for forming an antireflection layer is preferably 0.5 to 8 mass %, and more preferably 1 to 5 mass %, based on the total solid components in the composition because the amount of the photopolymerization initiator is required to be set so that the amount the amount is sufficient for polymerizing compounds capable of being polymerized contained in the composition and starting points are not extremely increased.

When applying the composition for forming an antireflection layer on a light transmitting substrate, the phase separation structure in a sea-island form is formed, in which the component (A) constitutes the sea part and the component (B) constitutes the island part, due to difference hydrophilicity (hydrophobicity), composition ratio and viscosity between the monomer component (A) and the polymer component (B). In this case, the component (B) is preferably aggregated in a spherical shape to form the island part.

Subsequently, a solvent having permeability into the light transmitting substrate or an underlayer (a hardcoat layer, an antistatic layer, an antiglare layer, or a combination thereof) is permeated into the light transmitting substrate or the underlayer. In this case, a part of the component (A) as well is permeated into the light transmitting substrate or the underlayer. Then, the components (A) and (B) are cured by irradiating ionizing radiation to form an antireflection layer. Although the antireflection layer contains the components (A) and (B), the part of the component (A) is permeated into the light transmitting substrate or the underlayer as previously mentioned. As a result, a ratio of the component (B) to the component (A) in the antireflection layer is larger than the ratio in the composition. Therefore, the island part constituted by the component (B) protrudes from the sea part constituted by the component (A) to form the convex portion.

An amount of the components (A) permeated into the light transmitting substrate or the underlayer is preferably 50 mass % or more based on the amount of the component (A) contained in the composition for forming an antireflection layer.

<(D) Inorganic Fine Particle having an Average Diameter of 10 to 300 nm and Surface-treated with Silane Coupling Agent having Molecular Weight of 600 or Less>

The antireflection layer in the antireflection film of an exemplary embodiment of the present invention preferably contains an inorganic fine particle (also referred to as "component (D)") having an average diameter of 10 to 300 nm and surface-treated with a silane coupling agent having a molecular weight of 600 or less.

Due to incorporation of the component (D), volume shrinkage in the island part at curing is reduced, and therefore a reflection index may be further lowered. Also, hardness of the antireflection layer may be improved due to the incorporation of the component (D).

From the viewpoints of difference in volume shrinkage and improvement of hardness, an amount of the component (D) in the island part is preferably larger than one in the sea part. Specifically, a ratio an amount of the component (D) in the sea part to an amount of the component (D) in the island part is preferably 0 to 0.3, and more preferably 0 to 0.1.

The inorganic fine particle, which is the component (D), to be used in an exemplary embodiment of the present invention preferably has an average diameter of 10 to 300 nm, more preferably 10 to 100 nm, and further preferably 10 to 80 nm.

A shape of the inorganic particle is most preferably a spherical shape, but even a non-spherical shape or a formless shape may be used as long as a desired unevenness structure can be obtained. The inorganic fine particle is preferably dispersed so as to prevent turbulent of a period of the convex portions.

The average diameter of the inorganic fine particle may be measured by a light scattering method or observation with an electron microscope (a microscopic method).

In an exemplary embodiment of the present invention, an average diameter means an average diameter in a case where observed particles are subjected to spherical approximation.

A component of the inorganic fine particle is not particularly limited. Examples of the specific component include an oxide of silicon, titanium, aluminum, tin, zinc, antimony, or the like, or a mixture thereof, and a metal oxide fine particle is preferable, and a particle containing a metal oxide of silicone as a main component at the surface of the particle is more preferable. For example, a core-shell particle of which surface is constituted by silica or a core-shell particle of which surface is constituted by a mixed crystal of silica and another inorganic atom may be adopted. From the viewpoint of lowering a reflection index, a particle of silica is preferable.

A refractive index of the inorganic fine particle, which is the component (D), is 2.00 or less, preferably 1.15 to 1.52, more preferably 1.15 to 1.46, further preferably 1.15 to 1.40, and most preferably 1.17 to 1.35. Since the inorganic fine particle, which is the component (D), is locally distributed in the island part of the antireflection layer and contributes to improvement of scratch resistance and lowering a refractive index, the inorganic fine particle preferably has a low refractive index.

Meanwhile, a refractive index of the inorganic fine particle may be measured with Abbe's refractometer manufactured by ATAGO CO., LTD. at 25° C. using D line.

The inorganic fine particle, which is the component (D) may have a hollow structure. In the case of the inorganic fine particle having a hollow structure, a refractive index does not mean a refractive index of an inorganic material constituting an outer shell, but an average value of refractive index of whole particle. In this case, voidage x is represented by equation (II) when a represents a radius of void in the particle and b represents a radius of the outer shell of the particle.

$$x=(4\pi a^3/3)/(4\pi b^3/3)\times 100 \qquad \text{Equation (II):}$$

Voidage x is preferably 10 to 60%, more preferably 20 to 60%, further preferably 30 to 60%. By being the voidage x in this range, low refractive index property may be obtained and strength of the particle may be appropriately adjusted.

The inorganic fine particle, which is the component (D), is preferably an inorganic fine particle surface-treated with a silane coupling agent having a molecular weight of 600 or less for showing excellent dispersion stability in a dispersion or an application solution or enhancing affinity or connectivity with the component (B). A molecular weight of the silane coupling agent is preferably 90 to 600, more preferably 100 to 400, and most preferably 120 to 300 to obtain sufficient dispersion stability in a dispersion or an application solution, without obstructing interaction with the component (B) and to enhance affinity and connectivity with the component (B). A molecular weight of the silane coupling agent in an exemplary embodiment of the present invention means a molecular weight in a state where a group capable of being hydrolyzed, the group connected to silicon atom in a silane coupling agent, which contributes to connection with the surface of the inorganic fine particle, is hydrolyzed by a silanol group (Si—OH).

Examples of preferable silane coupling agent include trimethylmethoxysilane, triethylmethoxysilane, trimethylethoxysilane, triethylethoxysilane, methyltrimethoxysilane, dimethyldimethoxysilane, vinyltrimethoxysilane, vinyltriethoxysilane, 2-(3,4-epoxycyclohexyl)ethyltrimethoxysilance, 3-glycidoxypropyltrimethoxysilane, 3-acryloyloxypropyltrimethoxysilane, 3-methacryloyloxypropyltrimethoxysilane, 3-methacryloyloxyoctyltrimethoxysilane, and the like. Among a silane coupling agent, a silane coupling agent preferably contains an alkyl group or an alkyl group having a polymerizable functional group. Examples of a polymerizable functional group, an epoxy group, a vinyl group, a (meth)acryloyl group, or the like are preferable, and an acryloyl group is most preferable. Due to introduction of these functional groups, strength of a layer (region) in which the inorganic particle is locally distributed may be improved.

In the inorganic fine particle, which is the component (D), a surface-modified ratio α is preferably 0.1% to 25%, more preferably 1% to 23%, further preferably 3% to 20%, and particularly preferably 4% to 15%, from the viewpoint of dispersion stability in a dispersion or an application solution and prevention of steric repulsion to interact with the component (B).

The surface-modified ratio of the inorganic fine particle may be measured by a know method such as Solid 29Si CP-MAS NMR. CP-MAS method is an indirect method in which 1H nuclear is excited, and magnetization thereof is transferred to 29Si nuclear by alternative polarization and it is measured. This method may measure a peak behavior of Si at the outermost surface, and realize a connection form in a solid by investigating obtained intensities of peaks having difference in chemical shift. The surface-modified ratio α may be expressed by M/Q, D/Q and T/Q (an intensity ratio of a peak derived from a silane coupling agent to a peak of silica) to be described hereinafter, depending on a kinds of a silane coupling agent. For example, a surface-modified ratio α1 of trimethylsilane may be obtained by M/Q since one molecular thereof contains one alkoxy group, and a surface-modified ratio α2 of γ-acryloyloxypropyltrimethoxysilane may be obtained by T/Q since one molecular thereof contains three alkoxy groups.

It is possible to quantitatively evaluate a surface state of a particle containing silicon atom by measuring a solid NMR of silicon atom. Initially, information obtained from Solid 29Si CP-MAS NMR will be described. In 29Si-NMR, chemical shift is varied depending on an atom connecting to a silicon atom. Therefore, a connection form in a solid may be realized by investigating an intensity of each peak. Conventionally, a tetrafunctional silicon atom is represented by Q, a trifunctional silicon atom is represented by T, a bifunctional silicon atom is represented by D, and a monofunctional silicon atom is represented by M. The number of connection with a silicon atom via an oxygen atom is represented by superscript. Examples of notation corresponding to chemical structures are shown below.

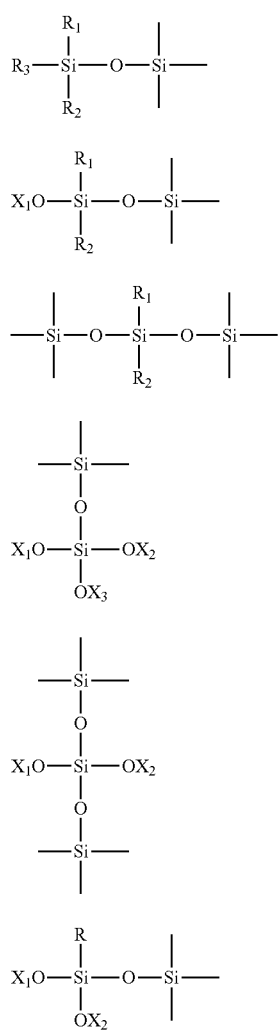
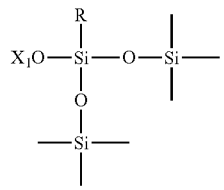
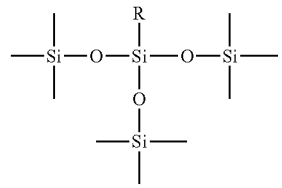
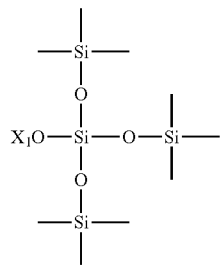
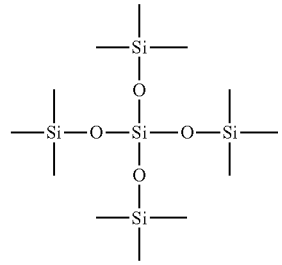

In the above formulae, R, $R_1$, $R_2$ and $R_3$ represent a substituent in which an atom directly connecting to an silicon atom is not an oxygen atom, and $X_1$, $X_2$ and $X_3$ represent a substituent in which an atom directly connecting to an oxygen atom is not a silicon atom.

By performing a surface treatment with a silane coupling agent having a molecular weight of 600 or less, a silanol group at the surface of the inorganic fine particle containing a silicon atom is reduced, and Si—O—Si is produced, and thereby a NMR peak is changed. In a case of evaluating a silica particle dispersed, powder of silica is obtained by evaporating a solvent by reducing pressure at 25° C., and obtained one is used for measurement.

NMR measurement is performed by 29Si CP-MAS method using values obtained by measurement with the following apparatus.

AVANCE-300 Console, BL-7 CP-MAS probe, manufactured by Bruker Corporation

Mearing range: 18000 Hz
Frequency: 59.621 MHz
MAS rotation rate: 4000 Hz
1H-90° pulse width: 5.0 ms
Contact time: 5 ms
Pulse repetition period: 5 s A CP/MAS method in high resolution solid state NMR is disclosed by Gendai-Kagaku series, Special Edition, titled "Koubunkainou NMR -Kiso to Atarashii Tenkai-" (author: Hajime Saito and Isao Morishima), edited by Tokyo Kagaku Doujin, 1987 version, p. 40 to p. 50.

By using a peak area of NMR signal measured in the above manner, the following values may be calculated.

M/Q is defined as the following, and an index of ratio that a monofunctional silane coupling agent is chemically bonded to a silicon atom at the surface. Larger M/Q value is, larger a surface-treated amount is.

$$M/Q=M/(Q1+Q2+Q3+Q4)$$

In the above formula, M represents a peak area of NMR signal to the structure M.

D/Q is defined as the following, and an index of ratio that a bifunctional silane coupling agent is chemically bonded to a silicon atom at the surface. Larger D/Q value is, larger a surface-treated amount is.

$$D/Q=(D1+D2)/(Q1+Q2+Q3+Q4)$$

In the above formula, D represents a peak area of NMR signal to the structure D.

T/Q is defined as the following, and an index of ratio that a trifunctional silane coupling agent is chemically bonded to a silicon atom at the surface. Larger T/Q value is, larger a surface-treated amount is.

$$T/Q=(T1+T2+T3)/(Q1+Q2+Q3+Q4)$$

In the above formula, Ti (i=1 to 3) represents a peak area of NMR signal to the structure Ti.

In a case where the inorganic fine particle is surface-treated in a dispersed state, the above NMR measurement may be performed by using a particle obtained by removing a dispersion medium under a condition of reducing pressure at 25° C.

Ratio of Inorganic Fine Particle (Component (D)) and Component (B)

A ratio of the component (B) to the component (D) is preferably 10 to 200 mass %, more preferably 15 to 150 mass %, and further preferably 50 to 150 mass %. By falling within this range, local distribution of the particle at the upper side and strength of a film are preferably improved.

In the composition for forming an antireflection layer, a mass ratio of (the component (B)+the component (D)) to (the component (A)) is preferably 1/199 to 60/40, more preferably 1/199 to 50/50, further preferably 1/99 to 19/81 and particularly preferably 1/99 to 10/90. Also, with respect to the components (A), (B) and (C), and the component (E) to be described later, a mass ratio of (the component (A)+the component (B)+the component (C))/(the component (E)) is preferably 1/199 to 60/40, more preferably 1/199 to 50/50, further preferably 1/99 to 19/81 and particularly preferably 1/99 to 10/90.

<(E) Solvent>

The composition for forming an antireflection layer preferably contains a solvent (E) (also referred to as "component (E)"). As the component (E), various solvents may be adopted, which are selected from the viewpoints of solubility or dispersibility of each component, even surface state in an application or drying process, storage stability, appropriate saturated vapor pressure, or the like.

A solvent may be singly used, or two or more kinds may be used in combination.

The component (E) preferably contains a mixed solvent of the following two kinds of solvent.

(E-1): Volatile solvent having difference in solubility parameter of 1 to 10 from solubility parameter of one of the component (A) and the component (B).

(E-2): Volatile solvent having a boiling point of 100° C. or less.

The component (E) preferably contains (E-3) which is a volatile solvent having a boiling point of more than 100° C. and a solvent permeable into substrate to be described later.

From the viewpoint of a drying load, a preferable solvent is a solvent containing a solvent having a boiling point of 100° C. or less at ordinary temperature and normal pressure as a main component and a solvent having a boiling point of more than 100° C. in a small amount (an amount of the solvent having a boiling point of more than 100° C. is 1 to 50 parts by mass, preferably 2 to 40 parts by mass, and more preferably 3 to 30 parts by mass based on 100 parts by mass of the solvent having a boiling point of 100° C. or less) for adjusting a drying speed. The difference of boiling points of two solvents is preferably 25° C. or more, more preferably 35° C. or more, and further preferably 50° C. or more. By using at least two organic solvents having different boiling point, a phase separation of the component (A) and the component (B) is easily occurred. The component (E) preferably contains a solvent having difference in solubility parameter of 1.0 to 10 from solubility parameter of the component (A) or the component (B) in a small amount (an amount thereof is 1 to 50 parts by mass, preferably 2 to 40 parts by mass, and particularly preferably 3 to 30 parts by mass based on 100 parts by mass of the solvent having a boiling point of 100° C. or less). By adding a solvent having poor solubility, the phase separation of the component (A) and the component (B) is promoted.

Examples of the solvent having a boiling point of 100° C. or less include: hydrocarbons such as hexane (boiling point: 68.7° C.), heptanes (98.4° C.), cyclohexane (80.7° C.) and benzene (80.1° C.); halogenated hydrocarbons such as dichloromethane (39.8° C.), chloroform (61.2° C.), carbon tetrachloride (76.8° C.), 1,2-dichloroethane (83.5° C.) and trichloroethylene (87.2° C.); ethers such as diethyl ether (34.6° C.), diisopropyl ether (68.5° C.), dipropyl ether (90.5° C.), tetrahydrofuran (66° C.); esters such as ethyl formate (54.2° C.), methyl acetate (57.8° C.), ethyl acetate (77.1° C.), isopropyl acetate (89° C.) and dimethyl carbonate (90.3° C.); ketones such as acetone (56.1° C.) and methyl ethyl ketone (79.6° C.); alcohols such as methanol (64.5° C.), ethyanol (78.3° C.), 2-propanol (82.4° C.) and 1-propanol (97.2° C.); cyano compounds such as acetonitrile (81.6° C.) and propyonitrile (97.4° C.); carbon disulfide (46.2° C.), and the like. Among them, ketones and esters are preferable, and ketones are particularly preferable. Of ketones, methyl ethyl ketone is particularly preferable.

Examples of the solvent having a boiling point of more than 100° C. include octane (125.7° C.), toluene (110.6° C.), xylene (138° C.), tetrachloroethylene (121.2° C.), chlorobenzene (131.7° C.), dioxane (101.3° C.), dibutyl ether (142.4° C.), isobutyl acetate (118° C.), cyclohexanone (155.7° C.), 2-methyl-4-pentanone (MIBK, 115.9° C.), 1-butanol (117.7° C.), N,N-dimethylformaldehyde (153° C.), N,N-dimethylacetoamide (166° C.), dimethylsulfoxide (189° C.), and the like. Cyclohexanone and 2-methyl-4-pentanone are preferable.

(Solvent having Permeability into Light Transmitting Substrate or Underlayer)

A solvent (permeable solvent) having permeability into the light transmitting substrate or the underlayer in an exemplary embodiment of the present invention will be described below.

The solvent having permeability into the light transmitting substrate or the underlayer is a solvent having solubility into the light transmitting substrate or the underlayer and swelling property.

Due to use of the solvent having solubility into the light transmitting substrate or the underlayer and swelling property, the component (A) is permeated into the light transmitting substrate or the underlayer, and thereby the moth-eye structure may be uniformly formed.

Here, the solvent having solubility into the light transmitting substrate or the underlayer in an exemplary embodiment of the present invention is a solvent having a peak area of a substrate component (surface component when the substrate has a plurality of layers) of 400 mV/sec or more when analysis is performed in the following manners (1) to (2).

(1) A substrate film having a size of 24 mm×36 mm (thickness: 80 μm) is immersed into a bin of 15 cc in which a solvent is put under room temperature (25° C.) for 60 seconds and is taken out.

(2) Solution in which the substrate film is immersed is analyzed by gel permeation chromatography (GPC).

The solvent having solubility into the light transmitting substrate or the underlayer in an exemplary embodiment of the present invention also means a solvent that when a substrate film having a size of 24 mm×36 mm (thickness: 80 μm) is placed into a bin of 15 cc in which the solvent is put under room temperature (25° C.) for 24 hours and the bin is shaken depending on necessity, the film is completely dissolved to be disappeared.

The solvent permeable into substrate may be selected depending on a component constituting the light transmitting substrate or the underlayer. In a case of using a cellulose acylate substrate, methyl ethyl ketone (MEK), dimethyl carbonate, methyl acetate, acetone, methylene chloride or the like may be preferably used. However, the solvent is not limited thereto as long as the solvent is capable of dissolving the substrate. Methyl ethyl ketone (MEK), dimethyl carbonate and methyl acetate are more preferable.

In a case of using an acryl substrate, dimethyl carbonate, methylethyl carbonate, diethyl carbonate, acetone, methyl ethyl ketone (MEK), cyclopentanone, cyclohexanone, methyl acetate, ethyl acetate, and the like, are preferable.

In the composition for forming an antireflection layer, an amount of the solvent permeable into the transmitting substrate or the underlayer is preferable 5 to 90 mass %, based on the total mass of the composition for forming an antireflection film, from the viewpoint of imparting application property without obstructing permeation of the component (A).

A solid concentration of the composition for forming an antireflection layer is preferably 2 to 70 mass %, from the viewpoint of application property.

In the composition for forming an antireflection layer, an amount of the component (A) is preferably 5 to 97 mass %, and more preferably 10 to 80 mass %, based on the total solid components in the composition for forming an antireflection layer, from the viewpoint of hardness of the whole antireflection layer. An amount of the component (B) is preferably 5 to 97 mass %, and more preferably 10 to 80 mass %, based on the total solid components in the composition for forming an antireflection layer.

<(E-1) Volatile Solvent having Difference in Solubility Parameter of 1 to 10 from Solubility Parameter of One of the Component (A) and the Component (B)>

In an exemplary embodiment of the present invention, a volatile solvent having difference in solubility parameter (SP value) of 1 to 10 from solubility parameter of one of the component (A) and the component (B) is preferably use.

A solvent having difference in solubility parameter of 1 to 10 from solubility parameter of the component (B) is preferably a solvent having absolute value of the difference in solubility parameter of 20 to 30, more preferably a solvent having absolute value of the difference in solubility parameter of 21 to 27, and further preferably a solvent having absolute value of the difference in solubility parameter of 22 to 26. Specific examples thereof include propyrene glycol monoethyl ether (SP value: 23.1), ethyl acetate (23.7), methanol (28.2), ethanol (25.7), 2-butanol (22.7), and the like. Among them, propylene glycol monoethyl ether is preferable.

In a process of proceeding with drying after applying a composition for application, a solvent having an absolute value of the difference in solubility parameter of 20 or more tends to have a low compatibility with the component (B). Therefore, in order to enhance the phase separation property, use of a solvent having an absolute value of difference in solubility parameter of 1.0 or more is preferable. When preparing the composition for application, a solvent having an absolute value of difference in solubility parameter of 30 or more is liable to be difficult for dissolving the component (B). Therefore, use of a solvent having an absolute value of difference in solubility parameter of 10 or less is preferable.

A solvent having difference in solubility parameter of 1 to 10 from solubility parameter of the component (B) is preferably a solvent having absolute value of the difference in solubility parameter of 10 to 20, and more preferably a solvent having absolute value of the difference in solubility parameter of 12 to 18.

Specific examples thereof include 1,1,2,2-tetrafluoro-1-(2,2,2-trifluoroethyoxy)ethane (14.5), trifluoromethylbenzene (16.8), perfluorohepthylethyl acetate (14.8), 1,1,2,2,3,3,4,4,5,5,6,6-dodecafluorohexylethyl acetate (16.7), trifluoromethyl acetate (15.7), and the like. Among them, 1,1,2,2-tetrafluoro-1-(2,2,2-trifluoroethyoxy)ethane is preferable. In order to use the solvents having difference in solubility parameter of 1 to 10 in combination, it is easily to satisfy a minimum required solubility while keeping a suitable phase separation property.

—Solubility Parameter—

Solubility parameter is an index representing ease of dissolution into a solvent or the like and has the same concept as "polarity" frequently used in a field of "organic compound". Lager solubility parameter is, larger polarity is. The component (B) to be used in an exemplary embodiment of the present invention is preferably a fluorine-containing polymer and has a solubility parameter of 19 or less, which is calculated by an estimation method of Fedor. The above solubility parameter is a value calculated by the estimation method of Fedor (disclosed in "SP value kiso—Ouyou to Keisanhouhou" (author: Hideki Yamamoto), p. 66, edited by JOHOKIKO CO., LTD., issued on 2005. 3. 31.

Viscosity may be measured by using various commercial available viscometer such as a B-type viscometer, an oscillational viscometer, an E-type viscometer and a shear viscometer. In an exemplary embodiment of the present invention, an oscillational viscometer CVJ-5000 manufactured by A&D Company, Limited is used for measuring viscosity. Although an arbitrary temperature and humidity in measurement conditions may be selected, a measurement in an exemplary embodiment of the present invention is performed under the condition of 25° C. and 60 RH %.

A weight average molecular weight and molecular weight may be measured by using GPC analyzer equipped with TSKgel GMHxL, TSKgel G4000HxL, or TSK gel G2000HxL (all manufactured by TOSOH CORPORATION) as a molecular weight in term of polystyrene under conditions of solvent (tetrahydrofuran) and refractive index detection.

An organic solvent, which is the component (E), in the application composition is preferably blended so that a solid component in the application composition is 2 to 70 mass %. The solid component in the application composition is preferably 3 to 60 mass %, and 5 to 50 mass %. When the solid component concentration is too low, there is a concern that unevenness of a film thickness (unevenness in thickness) is liable to be caused. Also, when the solid component concentration is too high, there is a concern that local distribution of the inorganic fine particle in a film is not sufficiently occurred, or unevenness of application is liable to be caused due to small amount of application.

<Preparing Method for Application Composition>

When preparing the application composition in an exemplary embodiment of the present invention, mixing a resultant obtained by dissolving or dispersing each component into a solvent may be performed. A method in which the polymer of the component (B) and the inorganic fine particle of the component (D) are mixed with the solvent of the component (E), and then the mixture is mixed with the monomer of the component (A).

[Configuration of Antireflection Film]

A cured film having the phase separation structure in a sea-island form is obtained by applying a composition obtained by mixing the components (A) to (E) on the light transmitting layer to form a film, drying the film by volatilizing the solvent from the film, and curing the film to form the cured film. The phase separation structure in a sea-island form includes the island part in which the cured product of the component (B) is locally distributed at the air interface side and the cured product becomes a convex portion and the sea part constituted by the cured product of the component (A). The island part preferably contains the components (B) and (D) as a main component, and the sea part preferably contains the component (A) as a main component. Density of the components (B) and (D) contained in the island part is preferably 1.5 times or more as large as an average density of the whole film made from the composition for forming an antireflection layer, more preferably 2.0 times or more, and most preferably 3.0 to 200 times. Density of the component (D) in the island part is preferably 20 to 90 vol %, more preferably 30 to 80 vol %, and most preferably 40 to 70 vol %.

The phase separation structure in a sea-island form in an exemplary embodiment of the present invention may be confirmed by, for example, DFM observation of the surface of an obtained film. In accordance with DFM observation of the surface, a surface distribution state may be observed based on difference in slippage.

When the composition for forming an antireflection layer is applied and then dried, the component (A), which has a free energy of mixing to a component derived from the component (B) of 0 or more, cases a phase separation. When the component (B) contains a fluorine component or a silicone component, since surface energy of these is small, the component derived from the component (B) is aggregated to lower a surface area, and at the same time, the component (D) surface-treated with a silane coupling agent having a molecular weight of 600 or less is locally distributed at the upper side of the film made from the component (B). Thus, the island part in which the component (B) and the component (D) are substantially locally distributed is formed. Also, the component (A) is locally distributed in a lower layer (at the side of substrate interface), and therefore the sea part constituted by a component derived from the component (A) as a main component may be formed.

A film thickness of the antireflection layer is preferably 0.05 to 0.78 μm, and more preferably 0.1 to 0.38 μm. The convex portion having low volume shrinkage in the sea-island structure formed by phase separation is considered a thickness of the antireflection film.

The antireflection film of an exemplary embodiment of the present invention may include a functional layer other than the antireflection layer. For example, an antistatic functional layer for preventing foreign materials from being adhered, a hardcoat layer for imparting mechanical strength, an antiglare layer for imparting antiglare property, or the like, may be provided depending on use.

Examples of configuration of the antireflection film include (light transmitting substrate/antireflection layer), (light transmitting substrate/hardcoat layer/antireflection layer), (light transmitting substrate/antistatic layer/antireflection film), (light transmitting substrate/antistatic hardcoat layer/antireflection film) and (light transmitting substrate/antiglare hardcoat layer/antireflection layer).

[Light Transmitting Substrate]

The light transmitting substrate is not particularly limited as long as the light transmitting substrate is capable to laminating various layers. However, a film substrate is preferable from the viewpoint of high productivity due to continuous conveyance.

The film substrate is not particularly limited as long as the film substrate is excellent in light transmittance of visible rays (preferably, light transmittance of 90% or more) and transparency (preferably, haze value of 1% or less). Specific examples thereof are a film made from a transparent polymer such as: polyester-based polymers such as polyethylene terephthalate and polyethylene nephtalate; cellulose-based polymers such as diacetylcellulose and triacetylcellulose; polycarbonate-based polymer; and acryl-based polymer such as polymethylmethacrylate. Also, a film made from a transparent polymer such as: styrene-based polymers such as polystyrene, acrylonitrile-styrene copolymer; olefin-based polymers such as polyethylene, polypropylene, polyolefine having a cyclic structure or a norbornene structure and ethylene-propylene copolymer; vinyl chloride-based polymers; and amide-based polymers such as nylon and aromatic polyamide, are exemplified. Further, a film made from a transparent polymer such as: imide-based polymers, sulfone-based polymers, polyethersulfone-based polymers, polyetherketone-based polymers, polyphenylenesulfide-based polymers, vinyl alcohol-based polymers, vinylidene chloride-based polymers, vinyl butyral-based polymers, acrylate-based polymers, polyoxymethylene-based polymers, epoxy-based polymers, a combination thereof, and the like, are exemplified. Particularly, a film having low birefringence is preferably used.

Among the above film substrate, a (meth)acryl-based resin film is preferable. The (meth)acryl-based resin film contains a (meth)acryl-based resin. The (meth)acryl-based resin film may be obtained by, for example, performing extrusion molding of a material for molding containing a (meth)acryl-based resin as a main component.

The (meth)acryl-based resin preferably has a Tg (glass transition temperature) of 115° C. or more. The Tg is more preferably 120° C. or more, further preferably 125° C. or more, and particularly preferably 130° C. or more. Due to the Tg of 115° C. or more, a substrate having excellent durability may be obtained. The upper limit of the Tg is not particularly limited, but preferably 170° C. or less, from the viewpoint of moldability or the like.

The (meth)acryl-based resin may be an arbitrary suitable (meth)acryl-based resin. Examples thereof include a (meth) acrylate ester such as polymethyl methacrylate, methyl methacrylate-(meth)acrylate copolymer, methyl methacrylate-(meth)acrylate ester copolymer, methyl methacrylate-acrylate ester-(meth)acrylate copolymer, methyl (meth)acrylate-styrene copolymer (MS resin or the like), polymer having alicyclic hydrocarbon group (for example, methyl methacrylate-cyclohexyl methacrylate copolymer, methyl methacrylate-norbornyl (meth)acrylate copolymer, or the like), and the like. Preferred is an alkyl group having 1 to 6 carbon atoms poly(meth)acrylate such as methyl poly(meth) acrylate, and more preferred is methyl methacrylate-based rein containing methyl methacrylate as a main component (50 to 100 mass %, preferably 70 to 100 mass %).

Specific examples of the (meth)acryl-based resin include ACRYPET VH and ACRYPET VRL20A, both manufactured by MITSUBISHI RAYON CO., LTD., a (meth)acryl-based resin having high Tg obtained by intramolecular crosslinking or intramolecular cyclization, and the like.

In an exemplary embodiment of the present invention, from the viewpoints of high heat resistance, transparency, and mechanical strength, a (meth)acryl-based resin having a glutaric anhydride structure, a (meth)acryl-based resin having a lactone ring structure, and a (meth)acryl-based resin having a glutarimide structure are preferable as the (meth) acryl-based resin.

Specific examples of the (meth)acryl-based resin having a glutaric anhydride structure are disclosed in JP-A-2006-283013, JP-A-2006-335902, JP-A-2006-274118, and the like.

Specific examples of the (meth)acryl-based resin having a lactone ring structure are disclosed in JP-A-2000-230016, JP-A-2001-151814, JP-A-2002-120326, JP-A-2002-254544, JP-A-2005-146084, and the like.

Specific examples of (meth)acryl-based resin having a glutarimide structure are disclosed in JP-A-2006-309033, JP-A-317560, JP-A-2006-328329, JP-A-2006-328334, JP-A-2006-337491, JP-A-2006-337492, JP-A-2006-337493, JP-A-2006-337569, JP-A-2007-009182, and the like.

An amount of the (meth)acryl-based resin in the (meth) acryl-based resin film is preferably 50 to 100 mass %, more preferably 50 to 99 mass %, further preferably 60 to 98 mass %, and particularly preferably 70 to 97 mass %. When the amount of the (meth)acryl-based resin is less than 50 mass %, there is a concern that inherent high heat resistance and high transparency of the (meth)acryl-based resin is not sufficiently exhibited.

An amount of the (meth)acryl-based resin in a material for molding a (meth)acryl-based resin film is preferably 50 to 100 mass %, more preferably 50 to 99 mass %, further preferably 60 to 98 mass %, and particularly preferably 70 to 97 mass %. When the amount of the (meth)acryl-based resin is less than 50 mass %, there is a concern that inherent high heat resistance and high transparency of the (meth) acryl-based resin is not sufficiently exhibited.

The (meth)acryl-based resin film may contain other thermoplastic resin than the (meth)acryl-based resin. Examples thereof include: olefine-based polymers such as polyethylene, polypropylene, ethylene-propylene copolymer and poly (4-methyl-1-pentene); vinyl halide-based polymers such as vinyl chloride, vinylidene chloride and chlorinated vinyl resin; acryl-based polymers such as polymethylmethacrylate; styrene-based polymers such as polystyrene, styrene-methyl methacrylate copolymer, styrene-acrylonitrile copolymer and acrylonitrile-butadiene-styrene block copolymer; polyesters such as polyethylene terephthalate, polybutylene terephthalate and polyethylene naphtalate; polyamides such as nylon 6, nylon 66 and nylon 610; polyacetals; polycarbonates; polyphenylene oxides; polyphenylene sulfides; polyetherether ketones; polysulfones; polyether sulfones; polyoxybenzylenes; polyamideimides; rubber like polymers such as ABS resin and ASA resin in which polybutadiene rubber and acrylic rubber are blended; and the like.

An amount of the other thermoplastic resin in the (meth) acryl-based resin film is preferably 0 to 50 mass %, more preferably 0 to 40 mass %, further preferably 0 to 30 mass %, and particularly preferably 0 to 20 mass %.

The (meth)acryl-based resin film may contain an additive. Examples of the additive include an antioxidant of a hindered phenol-based, a phosphorus-based, a sulfur-based, or the like; a stabilizer such as a light stabilizer, a weathering stabilizer, and a thermal stabilizer; a reinforcing material such as a glass fiber and a carbon fiber; an ultraviolet absorber such as phenyl salicylate, (2,2'-hydroxy-5-mehyl-phenyl) benzotriazole and 2-hydroxybenzophenone; a near infrared absorber; a flame retardant such as tris(dibromopropyl)phosphate, triallyl phosphate and antimony oxide; an antistatic agent such as an anionic surfactant, a cationic surfactant and a noionic surfactant; a coloring agent such as an inorganic pigment, an organic pigment and a dye; an organic filler or an inorganic filler; a resin-modifying agent; a plasticizer; a lubricant; a phase-difference reducing agent; and the like.

An amount of the additive in the (meth)acryl-based resin film is preferably 0 to 5 mass %, and more preferably 0 to 2 mass %, and further preferably 0 to 0.5 mass %.

A manufacturing method of the (meth)acryl-based resin film is not particularly limited. The (meth)acryl-based resin film may be formed by sufficiently mixing the (meth)acryl-based resin, the other polymer, the additive, and the like in a suitable manner to prepare a thermoplastic resin composition, and forming a film by using the thermoplastic resin composition. Also, the (meth)acryl-based resin film may be formed by separately preparing solutions of the (meth)acryl-based resin, the other polymer, the additive, and the like, mixing the solutions to prepare an uniform mixed solution, and then forming a film by using the mixed solution.

In order to prepare the thermoplastic resin composition, an arbitrary (appropriately) mixer such as an omnimixer is used for pre-blending raw materials of a film, and the obtained mixture is extruded and kneaded. In this case, a mixer for extrusion-kneading is not particularly limited, and an arbitrary (appropriately) mixer such as a single screw extruder, a twin screw extruder and a pressure kneader.

A method for forming a film may be an appropriate method such as a solution casting method, a molten extrusion method, a calendaring method, a compression molding method. Among them, a solution casting method and a molten extrusion method are preferable.

Examples of a solvent used for a solution casting method include: aromatic hydrocarbons such as benzene, toluene and xylene; aliphatic hydrocarbons such as cyclohexane and decalin; esters such as ethyl acetate and butyl acetate; ketones such as acetone, methyl ethyl ketone and methyl isobutyl ketone; alcohols such as methanol, ethanol, isopropanol, butanol, isobutanol, methyl cellosolve, ethyl cellosolve and butyl cellosolve; ethers such as tetrahydrofuran and dioxane; halogenated hydrocarbons such as dichloromethane, chloroform and carbon tetrachloride; dimethylformamide; dimethyl sulfoxide; and the like. These solvents may be used singly, or two or more kinds may be used in combination.

An apparatus for performing a solution casting method includes a drum type casting machine, a band type casting machine, a spin coater, and the like. A temperature for molding is preferably 150 to 350° C., and more preferably 200 to 300° C.

When a film is formed in a T-die method, a T-die is equipped with a tip of a single screw extruder or a twin screw extruder known, and a film extruded in a film form may be wound to form a film in a roll form. In this case, a temperature of a winding roller is appropriately adjusted and a stretching of the film in an extrusion direction is performed, and thereby a uniaxial stretching may be performed. Also, by stretching the film in a direction orthogonal to the extrusion direction, a biaxial stretching at one time or a successive biaxial stretching may be performed.

The (meth)acryl-based resin film may be an unstretched film or a stretched film. The stretched film may be a uniaxial stretched film or a biaxial stretched film. The biaxial stretched film may be a simultaneous biaxial stretched film or a successive biaxial stretched film. When a biaxial stretching is performed, mechanical strength is improved and properties of film are improved. The (meth)acryl-based resin film may prevent increase of phase difference by containing the other thermoplastic resin, even when a stretching is performed, and maintain optical isotropy.

An stretching temperature is preferably a temperature close to the glass transition temperature of the thermoplastic resin, which is a raw material. Specifically, the stretching temperature is preferably (glass transition temperature−30° C.) to (glass transition temperature+100° C.), and more preferably (glass transition temperature−20° C.) to (glass transition temperature+80° C.). When the stretching temperature is less than (glass transition temperature−30° C.), there is a concern that sufficient stretching magnification may not be obtained. On the other hand, when the stretching temperature exceeds (glass transition temperature+100° C.), the resin composition may be flowed and a stable stretching may not be performed.

A stretching magnification defined by an area ratio is preferably 1.1 to 25 fold, and more preferably 1.3 to 10 fold. When the stretching magnification is less than 1.1 fold, improvement of toughness due to the stretching may not be obtained. When the stretching magnification exceeds 25 fold, an advantageous effect obtained by enhancing stretching magnification may not be obtained.

A stretching speed is preferably 10 to 20000%/min, and more preferably 10 to 10000%/min in one direction. When the stretching speed is less than 10%/min, a time required to obtain sufficient stretching magnification becomes long, and thereby a cost for manufacturing may be high. When the stretching speed exceeds 20000%/min, there is a concern that a stretched film is broken.

The (meth)acryl-based resin film may be subjected to heat treatment such as annealing after the stretching treatment for stabilizing optical isotropy or mechanical properties. Conditions of the heat treatment may be appropriately selected.

A thickness of the (meth)acryl-based resin film is preferably 5 to 200 μm, and more preferably 10 to 100 μm. When the thickness is 5 μm or more, strength is not deteriorated and a crimp is not large in a durability test of a polarizing plate, which is preferable. When the thickness is 200 μm or less, transparency is not deteriorated, mixture permeability is not lowered, and a drying speed of water, which is a solvent of a water-based adhesive, when such a water-based adhesive is used.

A wet tensile strength at the surface of the (meth)acryl-based resin film is preferably 40 mN/m or more, more preferably 50 mN/m or more, and further preferably 55 mN/m or more. When the wet tensile strength at the surface is 40 mN/m or more, in forming a polarizing plate including the antireflection film of an exemplary embodiment of the present invention, an adhesion strength between the (meth)acryl-based resin film and a polarizing film is further improved. In order to adjust the wet tensile strength at the surface, an appropriate surface treatment may be performed. Examples of the surface treatment include a corona discharge treatment, a plasma treatment, an ozone treatment, an ultraviolet irradiation treatment, a flame treatment, a chemical treatment, and the like. Among them, a corona discharge treatment and a plasma treatment are preferable.

A thickness and a width of the light transmitting substrate may be appropriately determined A general thickness of the light transmitting substrate is about 10 to 500 μm in consideration of workability such as strength and handlability and down thickness. Also, a thickness of 20 to 300 μm is preferable, and a thickness of 30 to 200 μm is more preferable. A width of the light transmitting substrate is preferably 100 to 5000 mm, more preferably 800 to 3000 mm, and further preferably 1000 to 2000 mm. Further, a refractive index of the light transmitting substrate is not particularly limited. The refractive index is generally about 1.30 to 1.80, and preferably 1.40 to 1.70.

The light transmitting substrate preferably has a smooth surface, a value of center line average roughness Ra of the surface is preferably 1 μm or less, more preferably 0.0001 to 0.5 μm, and further preferably 0.001 to 0.1 μm.

The value of Ra may be measured in accordance with JIS B-0601.

[Manufacturing Method for Antireflection Film]

A manufacturing method for an antireflection film including a light transmitting layer and an antireflection layer, wherein the antireflection layer includes an unevenness structure on a surface at a side opposite to a side at which the light transmitting layer is provided, the method including: applying, above the light transmitting layer, a composition containing: an ionizing radiation curable monomer (A) including two or more polymerizable groups in a molecule; an ionizing radiation curable polymer (B) including two or more polymerizable groups, and having a SP value lower by 0.5 or more than the ionizing radiation curable monomer (A), a viscosity larger by 100 mPa·s than the ionizing radiation curable monomer (A) and a mass average molecular weight of 1000 or more; a polymerization initiator (C); and a solvent permeable into the light transmitting or an underlayer; phase-separating the ionizing radiation curable monomer (A) and the ionizing radiation curable polymer (B) in a sea-island form; permeating a part of the ionizing radiation curable monomer (A) into the light transmitting layer or the underlayer; and curing the ionizing radiation curable monomer (A) and the ionizing radiation curable polymer (B) to form an antireflection layer having a phase separation structure in the sea-island form including a sea part constituted by a cured product of the ionizing radiation curable monomer (A) and an island part constituted by a cured product of the ionizing radiation curable polymer (B) and protruding from the sea part to be a convex portion, wherein an area ratio of the sea part to the island part at an outermost surface of the antireflection layer is 1.0 or more, and a size of the island part which is the convex portion, and a period of a distance between convex portions adjacent to each other are 380 nm or less.

The components (A), (B), (C) and (E) are the same as those previously mentioned.

(Application Process)

An application method of the composition for forming an antireflection film includes a dip coating method, an air knife coating method, a curtain coating method, a roller coating method, a wire bar coating method, a gravure coating method, an extrusion coating method (die coating method) (see U.S. Pat. No. 2,681,294), a micro gravure coating method, and the like. Among them, a micro gravure coating method and a die coating method are preferable from the viewpoint of high productivity and uniformity of film.

(Process of Extrusion onto Support Using Slot Die)

In order to supply the antireflection film in an exemplary embodiment of the present invention in a high productivity, an extrusion method (die coating method) is preferably selected. A die coater to be suitably used in a region in which application amount is small (20 mL/m$^2$ or less) such as a hardcoat layer or an antireflection layer is disclosed in, for example, JP-A-2007-293313, and such a disclosure may be applied into the present invention.

(Drying Process)

After applying the composition for forming an antireflection film on the light transmitting substrate, the applied composition is conveyed by a web to a zone heated to dry the solvent. A temperature of the zone is preferably 0° C. to 140° C., and more preferably 10° C. to 120° C. The temperature of the zone may be adjusted, for example, so that the former region of the zone is a relatively low temperature and the latter region of the zone is a relatively high temperature. However, the temperature of zone is required to be a temperature or less, the temperature starting volatilization of the other components contained in the applied composition than the solvent. There is no limit of the drying process other than the above preferable drying condition, and a method to be adopted to a general drying process after application may be used.

(Curing Method)

A film of a laminate obtained after the application process and the drying process may be cured by ultraviolet irradiation and/or heat. Here, curing by ultraviolet irradiation means curing a dried film by ultraviolet irradiation by using a light source such as a low-pressure mercury lamp, a middle-pressure mercury lamp, a high-pressure mercury lamp, an ultrahigh-pressure mercury lamp, a carbon arc lamp, a metal halide lamp, a xenon lamp, an ArF excimer laser, a KrF excimer laser, an eximer lamp and a synchrotron radiation.

Conditions of ultraviolet irradiation are different depending on a lamp to be used for ultraviolet irradiation, but an irradiation light quantity is preferably 20 to 10000 mJ/cm$^2$, more preferably 100 to 2000 mJ/cm$^2$, and particularly preferably 150 to 1000 mJ/cm$^2$.

In the case of curing by ultraviolet irradiation, individual layers may be irradiated, and a laminate after lamination may be irradiated. In order to promote curing of the surface of the laminate when performing ultraviolet irradiation, a purge of nitrogen gas may be performed to lower an oxygen concentration. An oxygen concentration under the curing is preferably 5 vol % or less, more preferably 1 vol % or less, and further preferably 0.1 vol % or less.

[Hardcoat Layer]

The antireflection film of an exemplary embodiment of the present invention may include a hardcoat layer at one surface of the light transmitting substrate to impart physical strength. The antireflection film of an exemplary embodiment of the present invention preferably includes a hardcoat layer between the light transmitting substrate and the antireflection layer.

A thickness of the hardcoat layer is generally about 0.5 to 50 μm from the viewpoints of impact resistance, curl, productivity, and cost. The thickness of the hardcoat layer is preferably 1 to 30 μm, more preferably 2 to 20 μm, and most preferably 3 to 15 μm.

Also, strength of the hardcoat layer is preferably "H" or higher in a pencil hardness test, more preferably "2H" or higher, further preferably "3H" or higher, and most preferably "5H" or higher.

Further, in a taper test in accordance with JIS K5400, a low abrasion loss of a test piece after test is preferable.

A refractive index of the hardcoat layer is preferably 1.48 to 1.75, more preferably 1.49 to 1.6, and further preferably 1.50 to 1.55, from the viewpoints of optical design, reflection index, color, irregularity and cost.

[Conductive Layer]

The antireflection film of an exemplary embodiment of the present invention may include a conductive layer for prevention of static charge, and thereby it is possible to prevent foreign materials from being adhered at the surface of the antireflection film. The conductive layer may be provided as a separate single layer from other layers or as a multifunctional layer so that any of layers laminated show conductivity.

A thickness of the conductive layer is preferably 0.01 to 10 μm, more preferably 0.03 to 7 μm, and most preferably 0.05 to 5 μm. A surface resistance RH (Ω/sq) of the conductive layer is 5 to 12 as a log SR value, more preferably 5 to 11, and most preferably 6 to 10. The surface resistance of the conductive layer may be measured by a know measurement method such as a four-point probe method.

[Prevention Layer for Interference Unevenness]

The antireflection film of an exemplary embodiment of the present invention may include a prevention layer for interference unevenness for preventing interference unevenness at the surface of the antireflection film. Interference unevenness is a phenomenon that reflected light is interfered due to difference in refractive index of the substrate and a layer (for example, a hardcoat layer) applied on the substrate, and depending on unevenness in thickness, a color of the film is changed. In order to prevent the interference unevenness, there is a method of continuously varying a refractive index between the substrate and the layer applied on the substrate (JP-A-2003-205563, JP-A-2003-131007, and the like). The prevention layer for interference unevenness may be provided on the substrate.

[Protective Film for Polarizing Plate]

When the antireflection film of an exemplary embodiment of the present invention is used in a liquid crystal display device, the antireflection film of an exemplary embodiment of the present invention may be used as a surface protective film (protective film for polarizing plate) in a polarizing plate. In this case, by hydrophilizing the surface of the light transmitting substrate at a side opposite to a side at which an antireflection layer is provided, i.e., the surface to be adhered with a polarizing film, adhesion property with the polarizing film containing polyvinyl alcohol as a main component may be improved, and such a treatment is preferable.

[Polarizing Plate]

In a polarizing plate including the antireflection film of an exemplary embodiment of the present invention, the antireflection film of an exemplary embodiment of the present invention functions as a protective film for protecting the polarizing film and at least one side of front or rear side of the polarizing film. The polarizing plate including the antireflection film of an exemplary embodiment of the present invention is preferably a laminate including two protective films for protecting both sides of the polarizing film, wherein at least one of the two protective films is the antireflection film.

The polarizing plate includes the antireflection film as at least one of the protective film (protective film for polarizing plate) of the polarizing film. The light transmitting substrate of the antireflection film is adhered to the polarizing film via an adhesive layer containing polyvinyl alcohol or polyester urethane. The other protective film is adhered to the polarizing plate at the surface opposite to the surface at which the antireflection film is adhered via another adhesive layer. A pressure-sensitive adhesive layer is provided on the surface of the other protective film opposite to the surface at which the other protective film is adhered to the polarizing film.

By using the antireflection film of an exemplary embodiment of the present invention as a protective film for polarizing plate, a polarizing plate having excellent strength and excellent antireflection property may be manufactured, and it is possible to largely reduce the cost for manufacturing.

Also, by manufacturing a polarizing plate including the antireflection film of an exemplary embodiment of the present invention as one protective film for polarizing plate and an optically compensation film having optical anisotropy as the other protective film for polarizing plate, a polarizing plate is capable of improving a contrast in bright room of a liquid crystal display device and largely widening a viewing angle in up and down, and left and right directions and oblique directions.

[Image Display Device]

Examples of an image display device including the antireflection film of an exemplary embodiment of the present invention include a liquid crystal display (LCD) device, a plasma display panel (PDP), an electroluminescence display (ELD), a cathode ray tube (CRT) display device, a field emission display (FED), a surface conduction electron emitter display (SED), and the like. Among them, the antireflection film of an exemplary embodiment of the present invention is preferably used as a surface film of a liquid crystal panel. In the image display device including the antireflection film of an exemplary embodiment of the present invention, a polarizing film having the antireflection film is directly adhered to a glass of a liquid crystal cell of the liquid crystal display device, or the polarizing film having the antireflection film is adhered to the glass via another layer.

The polarizing plate including the antireflection film of an exemplary embodiment of the present invention may be preferably used for a transmissive, reflective, or semi-transmissive liquid crystal display device in a TN mode, a STN mode, a VA mode, an IPS mode, an OCB mode, or the like.

When the polarizing plate is used for a transmissive or semi-transmissive liquid crystal display device, by using a commercial available a brightness enhancement film (polarized light separation film having a polarized light selection layer such as D-BEF manufactured by Sumitomo 3M Limited) in combination, there may be obtained a display device having excellent visibility.

Also, by using a λ/4 plate in combination, it is possible to reduce reflected light from the surface or the inside as a polarizing plate for a reflective liquid crystal display device or a surface protective plate for an organic electroluminescence display.

EXAMPLES

<Manufacturing Antireflection Film>

((a) Synthesis of Ion Conductive Compound IP-1)

A compound IP-1 (30 mass % ethanol solution) which a polymer containing a quaternary ammonium base having an ethylene oxide chain was synthesized as a corresponding compound to Compound (A-2) in Japanese Patent No. 4,600,605 in the same manner as in Synthesis Example 2 of Japanese Patent No. 4,600,605.

(Preparation of Application Solution for Antistatic Hardcoat Layer)

The following components were placed into a mixing tank, stirred and filtrated by using a filter with a hole diameter of 0.5 μm, made of polypropylene, to obtain an application solution A-1 for antistatic hardcoat layer (concentration of nonvolatile component: 50 mass %).

| | |
|---|---|
| Methyl acetate | 50 parts by mass |
| MEK (methyl ethyl ketone) | 50 parts by mass |
| A-TMMT | 87.5 parts by mass |
| IP-1 | 10 parts by mass |
| IRG 127 | 2.45 parts by mass |
| Fluoroaliphatic group-containing polymer FP-13 | 0.05 parts by mass |

(Manufacturing Antistatic Hardcoat Layer A-1)

The application solution A-1 for antistatic hardcoat layer was applied on a light transmitting substrate (TD60UL: triacetylcellulose film, thickness of 60 μm, manufactured by FUJIFILM Corporation) by using a die coater at a conveying speed of 30 m/min, and dried at 60° C. for 120 seconds. Then, the applied film was cured by irradiating ultraviolet ray by using an air cooling metal halide lamp of 160 W/cm (manufactured by EYE CRAPHICS Co., Ltd.) under conditions in illuminance of 400 mW/cm$^2$ and irradiation amount of 60 mJ/cm$^2$, while conducting nitrogen purge (oxygen concentration of 0.03 vol % or less), to form an antistatic hardcoat layer A-1 with a thickness of 5 μm.

(Manufacturing Antireflection Layer)

[Preparation of Silica Particle Dispersion S-1]

To 333 parts by mass of sol A of silica particles (IPA-ST-ZL, average particle diameter: 85 nm, silica concentration: 30%, manufactured by NISSAN CHEMICAL INDUSTRIES, LTD.), 10 parts by mass of γ-acryloyloxypropyltrimethoxysilane (molecular weight defined in the present application: 192), 1.51 parts by mass of diisopropoxyalminium ethyl acetate, and 500 parts by mass of methyl ethyl ketone were added, and mixed, followed by further adding 3 parts by mass of ion exchange water thereto. The mixed solution was reacted at 60° C. for 8 hours and then cooled down to room temperature, and 1.8 parts by mass of acethylacetone was added thereto to obtain dispersion. Then, while adding cyclohexanone to the dispersion so that a content of silica is almost constant, solvent substitution due to vacuum distillation was performed at a pressure of 30 Torr. Finally, by adjusting concentration, silica particle dispersion S-1 in which silica particles were surface-treated with a silane coupling agent having a polymerizable functional group and having a solid concentration of 21.7% (silica concentration: 20%) was obtained.

[NMR Evaluation of Surface-treated Silica (Surface-modified Ratio)]

Each dispersion of inorganic fine particle was evaporated and dried at 25° C. by using a rotary evaporator. Then, a solid NMR measurement was performed in the above described manner to obtain a surface-modified ratio α (in this silane coupling agent, α2=T/Q). The obtained results are shown Table 3.

(Preparation of Composition B-1 for Forming Antireflection Layer)

In accordance with Table 4, each component was added to form a composition B-1 for forming antireflection layer, the obtained mixture was placed into a mixing tank, stirred, and filtrated by using a filter with a hole diameter of 0.5 μm, made from polypropylene, to obtain a Composition B-1 for forming antireflection layer (concentration of solid component: 50 mass %).

(Manufacturing Antireflection Layer)

The composition B-1 for forming antireflection layer was applied on the antistatic hardcoat layer A-1 by using a die coater at a conveying speed of 30 m/min, and dried by using a hot air drying furnace at 120° C. for 5 minutes. Then, the applied film was cured by irradiating ultraviolet ray by using an air cooling metal halide lamp of 240 W/cm (manufactured by EYE CRAPHICS Co., Ltd.) under conditions in illuminance of 600 mW/cm$^2$ and irradiation amount of 600 mJ/cm$^2$, while conducting nitrogen purge (oxygen concentration of 0.03 vol % or less), to form an antireflection layer, and thereby the antireflection film sample No. 1 was obtained. Meanwhile, a thickness of the antireflection layer was set to be a thickness that is 0.8 μm when the antireflection layer is formed on a glass in the same manner in application and curing.

(Preparation of Application Solution A-2 for Hardcoat Layer)

The following components were placed into a mixing tank, stirred and filtrated by using a filter with a hole diameter of 0.4 μm, made of polypropylene, to obtain an application solution A-2 for hardcoat layer (concentration of nonvolatile component: 50 mass %).

| | |
|---|---|
| Methyl acetate | 50 parts by mass |
| MEK (methyl ethyl ketone) | 50 parts by mass |
| A-TMMT | 87.5 parts by mass |
| U-4HA | 10 parts by mass |
| IRG 127 | 2.45 parts by mass |
| Fluoroaliphatic group-containing polymer FP-13 | 0.05 parts by mass |

(Preparation of Application Solution A-3 for Hardcoat Layer)

The following components were placed into a mixing tank, stirred and filtrated by using a filter with a hole diameter of 0.5 μm, made of polypropylene, to obtain an application solution A-3 for antistatic hardcoat layer (concentration of nonvolatile component: 50 mass %).

| | |
|---|---|
| Methyl acetate | 40 parts by mass |
| MEK (methyl ethyl ketone) | 40 parts by mass |
| Methanol | 20 parts by mass |
| A-TMMT | 87.5 parts by mass |
| IP-1 | 10 parts by mass |
| IRG 127 | 2.45 parts by mass |
| Fluoroaliphatic group-containing polymer FP-13 | 0.05 parts by mass |

(Preparation of Application Solution B-107 for Antireflection Layer)

The following components were placed into a mixing tank, stirred and filtrated by using a filter with a hole diameter of 0.4 μm, made of polypropylene, to obtain an application solution B-107 for antireflection layer (concentration of nonvolatile component: 4 mass %).

| | |
|---|---|
| MEK (methyl ethyl ketone) | 70 parts by mass |
| PGMEA (propylene glycol monomethyl ether acetate) | 30 parts by mass |
| DPHA | 50 parts by mass |
| Sururia 2320 | 45 parts by mass |
| IRG 127 | 3 parts by mass |
| X-22-164C | 2 parts by mass |

[Preparation of Silica Particle Dispersion S-2]

Silica particle dispersion S-2 was obtained in the same manner as in preparation of silica particle dispersion S-1, except for using 8 parts of γ-acryloyloxypropyltrimethoxysilane (molecular weight defined in the present application: 192), and 1.21 parts by mass of diisopropoxyalminium ethyl acetate.

[Preparation of Silica Particle Dispersion S-3]

Silica particle dispersion S-3 was obtained in the same manner as in preparation of silica particle dispersion S-1, except for using 5 parts of γ-acryloyloxypropyltrimethoxysilane (molecular weight defined in the present application: 192), and 0.75 parts by mass of diisopropoxyalminium ethyl acetate.

[Preparation of Silica Particle Dispersion S-4]

Silica particle dispersion S-4 was obtained in the same manner as in preparation of silica particle dispersion S-1, except for using 15 parts of γ-acryloyloxypropyltrimethoxysilane (molecular weight defined in the present application: 192), and 2.27 parts by mass of diisopropoxyalminium ethyl acetate.

[Preparation of Silica Particle Dispersion S-5]

Silica particle dispersion S-5 was obtained in the same manner as in preparation of silica particle dispersion S-1, except for using 20 parts of γ-acryloyloxypropyltrimethoxysilane (molecular weight defined in the present application: 192), and 3.03 parts by mass of diisopropoxyalminium ethyl acetate.

[Preparation of Silica Particle Dispersion S-6]

Silica particle dispersion S-6 was obtained in the same manner as in preparation of silica particle dispersion S-1, except for using 10 parts by mass of dimethyldimethoxysilane (molecular weight defined in the present application: 80) in place of 10 parts of γ-acryloyloxypropyltrimethoxysilane. A surface-modified ratio α (T/Q) of the obtained silica particle dispersion S-6 was 8.2%.

[Preparation of Silica Particle Dispersion S-7]

Silica particle dispersion S-7 was obtained in the same manner as in preparation of silica particle dispersion S-1, except for using 14.2 parts by mass of γ-methacryloyloxyoctyltrimethoxysilane (molecular weight defined in the present application: 272) in place of 10 parts of γ-acryloyloxypropyltrimethoxysilane. A surface-modified ratio a (T/Q) of the obtained silica particle dispersion S-7 was 6.6%.

TABLE 3

| Silica particle dispersion | Surface-modified ratio α (%) |
|---|---|
| S-1 | 6.6 |
| S-2 | 5.3 |

TABLE 3-continued

| Silica particle dispersion | Surface-modified ratio α (%) |
|---|---|
| S-3 | 3.3 |
| S-4 | 9.9 |
| S-5 | 13.2 |
| S-6 | 8.2 |
| S-7 | 6.6 |

In the same manner as in preparation of composition B-1 for forming antireflection layer, each component was mixed and adjusted so as to be the composition shown Table 4 to prepare compositions B-2 to B-30, and B-101 to B-106, having concentration of solid component of 50 mass %.

Antireflection film samples No. 2 to 28 and 30 to 36 were manufactured in the same manner as in manufacture of antireflection film sample No. 1, except for changing an antistatic hardcoat layer, a hardcoat layer and a composition for forming antireflection layer as shown in Table 5.

[Manufacture of (Meth)Acryl-based Resin Film 1]

Pellets of a mixture of 90 parts by mass of a (meth)acryl-based resin having a lactone ring structure and represented by formula (1A) {monomer mass ratio in copolymer=methyl methacrylate/2-(hydroxymethyl)methyl acrylate=8/2, lactonization ratio: about 100%, content of the lactone ring structure: 19.4%, weight average molecular weight: 133000, melt flow rate: 6.5 g/10 min (240° C., 10 kgf), Tg: 131° C.} and 10 parts by mass of an acrylonitrile-styrene (AS) resin (TOYO ASAS 20, manufactured by TOYO STYRENE CO., LTD.) were supplied to a twin screw extruder, and melt-extruded at 280° C. in a sheet form to obtain a (meth)acryl-based resin sheet with a thickness of 110 μm, having a lactone ring structure. This unstretched sheet was stretched at 160° C. with a stretching magnification in vertical direction of 2.0 fold and a stretching magnification in horizontal direction of 2.4 fold to obtain a (meth)acryl-based resin film 1 (thickness: 40 μm, in-plane phase difference: Δnd: 0.8 nm, phase difference in thickness direction: Rth(550 nm): 1.5 nm).

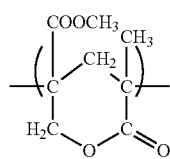

(1A)

(Corona Discharge Treatment)

One surface of the obtained (meth)acryl-based resin film was subjected to a corona discharge treatment (electron irradiation amount in corona discharge: 77 (W/m$^2$)/min)

Antireflection film sample No. 29 was manufactured in the same manner as in manufacture of antireflection film sample No. 1, except for changing the light transmitting substrate to the (meth)acryl-based resin film 1, and using the hardcoat layer A-2 and the composition B-26 for forming antireflection layer.

Antireflection film sample No. 101 was manufactured in the same manner as in manufacture of antireflection film sample No. 1, except for changing the light transmitting substrate to a PET (FD-100M, manufactured by FUJIFILM Corporation, thickness: 105 μm), providing no hardcoat layer and using the composition B-101 for forming antireflection layer. A thickness of the antireflection layer in the antireflection film sample No. 101 was 10 μm.

Antireflection film sample No. 102 was manufactured in the same manner as in manufacture of antireflection film sample No. 101, except for performing drying with, in place of the hot air drying furnace, a far infrared heating furnace (DIR 631, manufactured by YAMATO SCIENTIFIC CO., LTD.) by radiating light having wavelength of 6 to 20 μm.

Antireflection film samples No. 103 to 107 were manufactured in the same manner as in manufacture of antireflection film samples No. 1, except for changing the composition for forming antireflection layer as shown in Table 5.

Antireflection film sample No. 108 was manufactured in the same manner as in manufacture of antireflection film samples No. 36, except for changing the composition for forming antireflection layer to the composition B-107 for forming antireflection layer.

In Table 4, a content of each component other than a solvent represents "parts by mass" when preparing a composition.

Also, a content of each solvent is represented as a mass ratio of each solvent to the total solvent (volatile component).

TABLE 4

|  |  | B-1 | B-2 | B-3 | B-4 | B-5 | B-6 | B-7 | B-8 | B-9 | B-10 | B-11 |
|---|---|---|---|---|---|---|---|---|---|---|---|---|
| (A) Monomer | GMR-H | 65 |  |  |  |  |  |  |  |  |  |  |
|  | A-TMMT |  |  |  | 65 | 46 | 46 | 46 | 46 | 46 | 46 | 46 |
|  | A-TMM3-LMN |  | 65 | 46 |  |  |  |  |  |  |  |  |
|  | DPHA |  |  |  |  |  |  |  |  |  |  |  |
|  | UV7600B |  |  |  |  |  |  |  |  |  |  |  |
|  | HEMA |  |  |  |  |  |  |  |  |  |  |  |
| (B) Polymer | NFP-1 | 50 | 50 |  |  |  |  |  |  |  |  |  |
|  | NFP-2 |  |  | 35 |  |  |  |  |  |  |  |  |
|  | P-2 |  |  |  | 50 |  |  |  |  |  |  |  |
|  | IPF-4 |  |  |  |  | 35 | 35 | 35 | 35 | 35 | 35 | 35 |
|  | IPF-37 |  |  |  |  |  |  |  |  |  |  |  |
|  | IPF-10 |  |  |  |  |  |  |  |  |  |  |  |
|  | IPF-2 |  |  |  |  |  |  |  |  |  |  |  |
|  | IPF-35 |  |  |  |  |  |  |  |  |  |  |  |
|  | BR50 |  |  |  |  |  |  |  |  |  |  |  |
|  | X-22-164C |  |  |  |  |  |  |  |  |  |  |  |

TABLE 4-continued

|   |   |   |   |   |   |   |   |   |   |   |   |
|---|---|---|---|---|---|---|---|---|---|---|---|
| (C) Initiator | IGR907 | 3 | 3 | 2.1 | 3 | 2.1 | 2.1 | 2.1 | 2.1 | 2.1 | 2.1 | 2.1 |
|  | IRG184 |  |  |  |  |  |  |  |  |  |  |  |
|  | IRG127 |  |  |  |  |  |  |  |  |  |  |  |
| (D) Particles | MIBK-ST |  |  | 100 |  | 100 |  |  |  |  |  |  |
|  | MIBK-SD |  |  |  |  |  | 100 |  |  |  |  |  |
|  | MIBK-SD-L |  |  |  |  |  |  | 100 |  |  |  |  |
|  | S-1 |  |  |  |  |  |  |  | 100 |  |  |  |
|  | S-2 |  |  |  |  |  |  |  |  | 100 |  |  |
|  | S-3 |  |  |  |  |  |  |  |  |  | 100 |  |
|  | S-4 |  |  |  |  |  |  |  |  |  |  | 100 |
|  | S-5 |  |  |  |  |  |  |  |  |  |  |  |
|  | MEK-ST-2040 |  |  |  |  |  |  |  |  |  |  |  |
|  | MEK-ST-3040 |  |  |  |  |  |  |  |  |  |  |  |
|  | S-6 |  |  |  |  |  |  |  |  |  |  |  |
|  | S-7 |  |  |  |  |  |  |  |  |  |  |  |
|  | IPA-ST-ZL |  |  |  |  |  |  |  |  |  |  |  |
|  | OZ-S30K |  |  |  |  |  |  |  |  |  |  |  |
|  | Sururia 2320 |  |  |  |  |  |  |  |  |  |  |  |
| (E) Solvent | MEK | 100 | 100 | 100 | 100 | 100 | 100 | 100 | 100 | 100 | 100 | 100 |
|  | Methyl acetate |  |  |  |  |  |  |  |  |  |  |  |
|  | PGMEA |  |  |  |  |  |  |  |  |  |  |  |
|  | Cyclohexane |  |  |  |  |  |  |  |  |  |  |  |
|  | MIBK |  |  |  |  |  |  |  |  |  |  |  |

|   |   | B-12 | B-13 | B-14 | B-15 | B-16 | B-17 | B-18 | B-19 | B-20 |
|---|---|---|---|---|---|---|---|---|---|---|
| (A) Monomer | GMR-H |  |  |  |  |  |  |  |  |  |
|  | A-TMMT | 46 | 46 | 46 | 46 | 46 | 27 | 18 | 64 | 73 |
|  | A-TMM3-LMN |  |  |  |  |  |  |  |  |  |
|  | DPHA |  |  |  |  |  |  |  |  |  |
|  | UV7600B |  |  |  |  |  |  |  |  |  |
|  | HEMA |  |  |  |  |  |  |  |  |  |
| (B) Polymer | NFP-1 |  |  |  |  |  |  |  |  |  |
|  | NFP-2 |  |  |  |  |  |  |  |  |  |
|  | P-2 |  |  |  |  |  |  |  |  |  |
|  | IPF-4 | 35 | 35 | 35 |  |  | 49 | 56 | 21 | 14 |
|  | IPF-37 |  |  |  | 35 |  |  |  |  |  |
|  | IPF-10 |  |  |  |  | 35 |  |  |  |  |
|  | IPF-2 |  |  |  |  |  |  |  |  |  |
|  | IPF-35 |  |  |  |  |  |  |  |  |  |
|  | BR50 |  |  |  |  |  |  |  |  |  |
|  | X-22-164C |  |  |  |  |  |  |  |  |  |
| (C) Initiator | IGR907 | 2.1 | 2.1 | 2.1 | 2.1 | 2.1 | 2.1 | 2.1 | 2.1 | 2.1 |
|  | IRG184 |  |  |  |  |  |  |  |  |  |
|  | IRG127 |  |  |  |  |  |  |  |  |  |
| (D) Particles | MIBK-ST |  |  |  |  |  |  |  |  |  |
|  | MIBK-SD |  |  |  | 100 | 100 | 100 | 100 | 100 | 100 |
|  | MIBK-SD-L |  |  |  |  |  |  |  |  |  |
|  | S-1 |  |  |  |  |  |  |  |  |  |
|  | S-2 |  |  |  |  |  |  |  |  |  |
|  | S-3 |  |  |  |  |  |  |  |  |  |
|  | S-4 |  |  |  |  |  |  |  |  |  |
|  | S-5 | 100 |  |  |  |  |  |  |  |  |
|  | MEK-ST-2040 |  | 100 |  |  |  |  |  |  |  |
|  | MEK-ST-3040 |  |  |  |  |  |  |  |  |  |
|  | S-6 |  |  |  |  |  |  |  |  |  |
|  | S-7 |  |  |  |  |  |  |  |  |  |
|  | IPA-ST-ZL |  |  |  |  |  |  |  |  |  |
|  | OZ-S30K |  |  | 100 |  |  |  |  |  |  |
|  | Sururia 2320 |  |  |  |  |  |  |  |  |  |
| (E) Solvent | MEK | 100 | 100 | 100 | 100 | 100 | 100 | 100 | 100 | 100 |
|  | Methyl acetate |  |  |  |  |  |  |  |  |  |
|  | PGMEA |  |  |  |  |  |  |  |  |  |
|  | Cyclohexane |  |  |  |  |  |  |  |  |  |
|  | MIBK |  |  |  |  |  |  |  |  |  |

|   |   | B-21 | B-22 | B-23 | B-24 | B-25 | B-26 | B-27 | B-28 | B-29 |
|---|---|---|---|---|---|---|---|---|---|---|
| (A) Monomer | GMR-H |  |  |  |  |  |  |  |  |  |
|  | A-TMMT | 46 | 46 | 46 | 49 |  | 46 | 46 | 46 | 46 |
|  | A-TMM3-LMN |  |  |  |  |  |  |  |  |  |
|  | DPHA |  |  |  |  | 49 |  |  |  |  |
|  | UV7600B |  |  |  |  |  |  |  |  |  |
|  | HEMA |  |  |  |  |  |  |  |  |  |
| (B) Polymer | NFP-1 |  |  |  |  |  |  |  |  |  |
|  | NFP-2 |  |  |  |  |  |  |  |  |  |
|  | P-2 |  |  |  |  |  |  |  |  |  |
|  | IPF-4 | 35 | 35 |  | 35 |  |  | 35 | 35 | 35 |
|  | IPF-37 |  |  |  |  | 35 |  |  |  |  |
|  | IPF-10 |  |  |  |  |  |  |  |  |  |

TABLE 4-continued

|  |  |  |  |  |  |  |  |  |  |
|---|---|---|---|---|---|---|---|---|---|
|  | IPF-2 |  | 35 |  |  |  |  |  |  |
|  | IPF-35 |  |  |  |  | 35 |  |  |  |
|  | BR50 |  |  |  |  |  |  |  |  |
|  | X-22-164C |  |  |  |  |  |  |  |  |
| (C) Initiator | IGR907 | 2.1 | 2.1 | 2.1 | 2.1 | 2.1 | 2.1 | 2.1 | 2.1 |
|  | IRG184 |  |  |  |  |  |  |  |  |
|  | IRG127 |  |  |  |  |  |  |  |  |
| (D) Particles | MIBK-ST |  |  |  |  |  |  |  |  |
|  | MIBK-SD | 100 | 100 | 100 | 100 | 100 | 100 |  |  |
|  | MIBK-SD-L |  |  |  |  |  |  |  |  |
|  | S-1 |  |  |  |  |  |  |  |  |
|  | S-2 |  |  |  |  |  |  |  |  |
|  | S-3 |  |  |  |  |  |  |  |  |
|  | S4 |  |  |  |  |  |  |  |  |
|  | S-5 |  |  |  |  |  |  |  |  |
|  | MEK-ST-2040 |  |  |  |  |  |  |  |  |
|  | MEK-ST-3040 |  |  |  |  |  |  | 100 |  |
|  | S-6 |  |  |  |  |  |  |  | 100 |
|  | S-7 |  |  |  |  |  |  |  |  | 100 |
|  | IPA-ST-ZL |  |  |  |  |  |  |  |  |
|  | OZ-S30K |  |  |  |  |  |  |  |  |
|  | Sururia 2320 |  |  |  |  |  |  |  |  |
| (E) Solvent | MEK | 80 | 80 | 80 | 40 | 40 | 80 | 100 | 100 | 100 |
|  | Methyl acetate |  |  |  | 40 | 40 |  |  |  |
|  | PGMEA | 20 |  |  | 20 | 20 | 20 |  |  |
|  | Cyclohexane |  | 20 | 20 |  |  |  |  |  |
|  | MIBK |  |  |  |  |  |  |  |  |

|  |  | B-30 | B-101 | B-102 | B-103 | B-104 | B-105 | B-106 | B-107 |
|---|---|---|---|---|---|---|---|---|---|
| (A) Monomer | GMR-H |  |  |  |  |  |  |  |  |
|  | A-TMMT | 46 |  | 65 |  |  |  | 50 |  |
|  | A-TMM3-LMN |  |  |  |  |  |  | 65 |  |
|  | DPHA |  |  |  |  |  | 65 |  | 50 |
|  | UV7600B |  | 69 |  |  |  |  |  |  |
|  | HEMA |  |  |  |  | 65 |  |  |  |
| (B) Polymer | NFP-1 |  |  |  |  |  | 50 |  |  |
|  | NFP-2 |  |  |  |  |  |  |  |  |
|  | P-2 |  |  |  |  |  |  |  |  |
|  | IPF-4 | 35 |  |  | 50 | 50 |  |  |  |
|  | IPF-37 |  |  |  |  |  |  |  |  |
|  | IPF-10 |  |  |  |  |  |  |  |  |
|  | IPF-2 |  |  |  |  |  |  |  |  |
|  | IPF-35 |  |  |  |  |  |  |  |  |
|  | BR50 |  | 26 |  |  |  |  |  |  |
|  | X-22-164C |  |  |  |  |  |  |  | 2 |
| (C) Initiator | IGR907 | 2.1 |  | 3 | 3 | 3 | 3 | 3 |  |
|  | IRG184 |  | 5 |  |  |  |  |  |  |
|  | IRG127 |  |  |  |  |  |  |  | 3 |
| (D) Particles | MIBK-ST |  |  |  |  |  |  |  |  |
|  | MIBK-SD |  |  |  |  |  |  |  |  |
|  | MIBK-SD-L |  |  |  |  |  |  |  |  |
|  | S-1 |  |  |  |  |  |  |  |  |
|  | S-2 |  |  |  |  |  |  |  |  |
|  | S-3 |  |  |  |  |  |  |  |  |
|  | S4 |  |  |  |  |  |  |  |  |
|  | S-5 |  |  |  |  |  |  |  |  |
|  | MEK-ST-2040 |  |  |  |  |  |  |  |  |
|  | MEK-ST-3040 |  |  |  |  |  |  |  |  |
|  | S-6 |  |  |  |  |  |  |  |  |
|  | S-7 |  |  |  |  |  |  |  |  |
|  | IPA-ST-ZL | 100 |  |  |  |  |  |  |  |
|  | OZ-S30K |  |  |  |  |  |  |  |  |
|  | Sururia 2320 |  |  |  |  |  |  |  | 45 |
| (E) Solvent | MEK | 100 |  | 100 | 100 | 100 | 100 | 100 | 70 |
|  | Methyl acetate |  |  |  |  |  |  |  |  |
|  | PGMEA |  |  |  |  |  |  |  | 30 |
|  | Cyclohexane |  |  |  |  |  |  |  |  |
|  | MIBK |  | 100 |  |  |  |  |  |  |

The compounds used are described below.

A-TMMT: Pentaerythritol tetraacrylate (NK Ester, manufactured by SHIN-NAKAMURA CHEMICAL. CO., LTD.), SP value: 20.7, Viscosity: 800 mPa·s A-TMM3-LMN: Pentaerythritol triacrylate (NK Ester, manufactured by SHIN-NAKAMURA CHEMICAL. CO., LTD.), SP value: 21.6, Viscosity: 730 mPa·s IRG127: IRGACURE 127 (Polymerization initiator, manufactured by BASF Japan Ltd.)

U-4HA: Urethane acrylate monomer (NK Oligo, manufactured by SHIN-NAKAMURA CHEMICAL. CO., LTD.)

Bremmer-GMR-H: Glycerin dimethacrylate (manufactured by NOF Corporation), SP value: 21.5, Viscosity: 5.3 mPa·s DPHA: Mixture of dipentaerythritol pentaacrylate and dipentaerythritol hexaacrylate (manufactured by Nippon Kayaku Co., Ltd.), SP value: 21.4, Viscosity: 6,600 mPa·s UV 7600B: Hexafunctional urethane acrylate (SHIKOH, manufactured by The Nippon Synthetic Chemical Industry Co., Ltd.), SP value 22.0, Viscosity: 3000 mPa·s HEMA: Hydroxyethyl methacrylate (manufactured by NIPPON SHOKUBAI CO., LTD.), SP value: 26.5, Viscosity: 5.3 mPa·s NFP-1: Compound having no fluorine-containing structure and no polyalkylene oxide group (a polymer that in P-17 in Table 2, the unit derived from HFP/FPVE monomer is replaced with a unit derived from EVE monomer), weight average molecular weight: 22000, SP value: 21.0, Viscosity: 20000 mPa·s or more NFP-2: Compound having no fluorine-containing structure but having a polyalkylene oxide group (a polymer that in IPF-36 in Table 1, the unit derived from HFP monomer is replaced with a unit derived from EVE monomer), weight average molecular weight: 24000, SP value: 21.1, Viscosity: 10000 mPa·s or more P-2: Compound having a fluorine-containing structure and no polyalkylene oxide group (described in Table 2), weight average molecular weight: 23000, SP value: 19.2, Viscosity: 10000 mPa·s or more IPF-4: Compound having a fluorine-containing structure and a polyalkylene oxide group (described in Table 1), weight average molecular weight: 23000, SP value: 19.0, Viscosity: 10000 mPa·s or more IPF-37: Compound having a fluorine-containing structure and a polyalkylene oxide group (described in Table 1 and being different in molecular weight from IPF-4), weight average molecular weight: 14000, SP value: 19.0, Viscosity: 7000 mPa·s IPF-10: Compound having a fluorine-containing structure and a polyalkylene oxide group (described in Table 1), weight average molecular weight: 27000, SP value: 19.0, Viscosity: 10000 mPa·s or more IPF-2: Compound having a fluorine-containing structure and a polyalkylene oxide group (described in Table 1), weight average molecular weight: 23000, SP value: 19.0, Viscosity: 10000 mPa·s or more IPF-35: Compound having a fluorine-containing structure and a polyalkylene oxide group (described in Table 1), weight average molecular weight: 22000, SP value: 17.8, Viscosity: 10000 mPa·s or more BR-50: Styrene-methyl methacrylate copolymer (manufactured by Mitsubishi Rayon Co., Ltd.), weight average molecular weight: 65000, SP value: 21.6, Viscosity: 30000 mPa·S or more, no polymerizable group is contained in molecular IRG907: IRGACURE 907 (Photopolymerization initiator, manufactured by BASF Japan Ltd.)

IRG184: IRGACURE 184 (Photopolymerization initiator, manufactured by BASF Japan Ltd.)

IRG127: IRGACURE 127 (Photopolymerization initiator, manufactured by BASF Japan Ltd.)

IPA-ST-ZL: Silica dispersion, average particle size: about 15 nm (concentration of solid component: 30 mass %), solvent: isopropyl alcohol (IPA) (manufactured by NISSAN CHEMICAL INDUSTRIES, LTD.), refractive index of silica particles: 1.45, no group was detected at surface (untreated)

MIBK-ST: Silica dispersion, average particle size: about 15 nm (concentration of solid component: 30 mass %), solvent: methylisobutyl ketone (MIBK) (manufactured by NISSAN CHEMICAL INDUSTRIES, LTD.), refractive index of silica particles: 1.45, trimethyl silyl group was detected at surface (molecular weight defined in the present application: 90)

MIBK-SD: Silica dispersion, average particle size: about 15 nm (concentration of solid component: 30 mass %), solvent: methylisobutyl ketone (MIBK) (manufactured by NISSAN CHEMICAL INDUSTRIES, LTD.), refractive index of silica particles: 1.45, methacryloyloxypropyl group was detected at surface (molecular weight defined in the present application: 200)

MIBK-SD-L: Silica dispersion, average particle size: about 45 nm (concentration of solid component: 30 mass %), solvent: methylisobutyl ketone (MIBK) (manufactured by NISSAN CHEMICAL INDUSTRIES, LTD.), refractive index of silica particles: 1.45, methacryloyloxypropyl group was detected at surface (molecular weight defined in the present application: 200)

MEK-ST-2040: Silica dispersion, average particle size: about 200 nm (concentration of solid component: 30 mass %), solvent: methyl ethyl ketone (MEK) (manufactured by NISSAN CHEMICAL INDUSTRIES, LTD.), refractive index of silica particles: 1.45, trimethylsilyl group was detected at surface (molecular weight defined in the present application: 90)

MEK-ST-3040: Silica dispersion, average particle size: about 300 nm (concentration of solid component: 30 mass %), solvent: methyl ethyl ketone (MEK) (manufactured by NISSAN CHEMICAL INDUSTRIES, LTD.), refractive index of silica particles: 1.45, trimethylsilyl group was detected at surface (molecular weight defined in the present application: 90)

OZ-S30K: $ZrO_2$ dispersion, average particle size: about 7 nm (concentration of solid component: 30 mass %), solvent: methyl ethyl ketone (MEK) (manufactured by NISSAN CHEMICAL INDUSTRIES, LTD.), refractive index of $ZrO_2$ particles: 1.90, no group was detected at surface Sururia 2320: Hollow silica dispersion, average particle size: about 50 nm (concentration of solid component: 20 mass %), solvent: methyl ethyl ketone (MEK) (manufactured by JGC C&C), refractive index of silica particles: 1.30, methacryloyloxypropyl group was detected at surface (molecular weight defined in the present application: 200)

FP-13: Fluorine-containing surfactant having the structure below (dissolved into methyl ethyl ketone solvent in a concentration of solid component of 40 mass %)

X-22-164C: Polymerizable silicone compound (manufactured by Shin-Etsu Chemical Co., Ltd.)

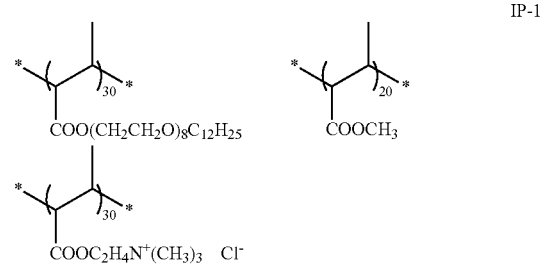

IP-1

-continued

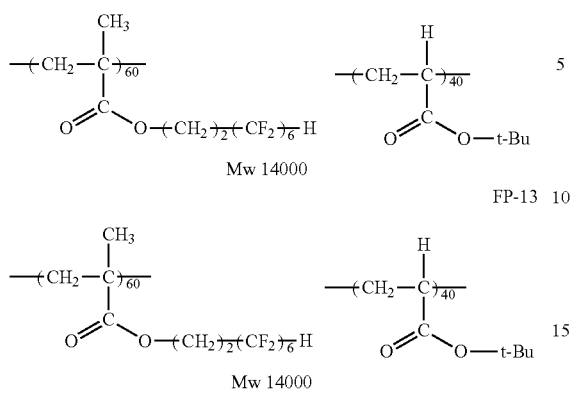

FP-13

Mw 14000

FP-13

Mw 14000

(Evaluation of Antireflection Film)

Properties of the obtained antireflection films were evaluated in accordance with the following manners. The results thereof are shown in Table 2.

(1) Observation of Phase Separation Structure A region of 10 μm square of a surface of an antireflection film was observed with a scanning probe microscope (SPA 400, manufactured SII Nano Technology Inc.) in DFM mode to evaluate a phase separation structure.

A: Sea-island structure can be clearly distinguished, a size of the island part is smaller than the period, and an area ratio of the sea part to the island part is 1.0 or more.

B: Sea-island structure can be dimly distinguished, a size of the island part is smaller than the period, and an area ratio of the sea part to the island part is 1.0 or more.

C: The island parts are connected, and a size of the island part is larger than the period.

D: Phase separation cannot be observed at all.

(2) Observation of Moth-eye Structure

A region of 10 μm square of a surface of an antireflection film was observed with a scanning probe microscope (SPA 400, manufactured SII Nano Technology Inc.) in AFM mode to evaluate the surface shape. A period of a pattern in the fine structure was calculated by using an average value of 50 distances between the convex portions adjacent to each other on a line randomly drawn from one end to another end of a scanning electron micrograph, and being round off to the nearest unit (less than 10 nm). In the case where the convex portion cannot be observed, it was determined "no period".

A: Moth-eye structure is clearly formed, and a ratio of height in unevenness to period distance is 0.9 or more and 1.0 or less.

B: Moth-eye structure is clearly formed, and a ratio of height in unevenness to period distance is 0.7 or more and less than 1.0.

C: Moth-eye structure is clearly formed, and a ratio of height in unevenness to period distance is 0.5 or more and less than 0.7.

D: Moth-eye structure is clearly formed, and a ratio of height in unevenness to period distance is less than 0.5.

E: Moth-eye structure is not formed.

(3) Thickness Measurement

The obtained sample was cut with a microtome to exposure the cross-section, the cross-section was dyed with osmium tetrachloride solution of about 3% all night, and a surface was cut again to perform SEM observation. In a reflected electron image, from the substrate side, the whole region from a part linearly dyed in bright to a layer observed as a dark portion was considered a permeation layer, and a layer above the permeation layer, observed as a bright portion was considered a hardcoat layer, and then each thickness thereof was measured.

(4) Integral Reflection Index Measurement

After roughening the rear surface (substrate side) of the antireflection film with a sand paper, the rear surface was treated with a black ink not to occur reflection at the rear surface, and an integral spectral reflection index of the other surface (antireflection layer side) was measured by using a spectrophotometer (manufactured by JASCO Corporation) at incidence angle of 5° in a wavelength range of 380 to 780 nm. An arithmetic mean value of the integral spectral reflection index in 450 to 650 nm was used for Table 5.

(5) Evaluation of Pencil Hardness

A pencil hardness test was performed in accordance with JIS K 5400. After humidifying the antireflection film at a temperature of 25° C. and a humidity of 60% RH, to the surface at the antireflection layer side was evaluated by using a pencil for test in accordance with JIS S 6006.

(6) Surface Haze Measurement

[1] In accordance with JIS-K7136, a total haze value (H) of the obtained antireflection films was measured by using a Haze Meter NDH 5000, manufactured by NIPPON DENSHOKU INDUSTRIES Co., LTD.

[2] To the front and rear surfaces of the antireflection film, immersion oil (Immersion oil TYPE A, manufactured by Nikon Corporation, refractive index n: 1.515) for microscope was added dropwise, and the antireflection film was sandwiched, from the front and rear surface thereof, between two glass plates having 1 mm (microscope slide, item number: S9111, manufactured by Matsunami Glass Ind., Ltd.) to closely adhere the two glass plates and the antireflection film. A haze (Ha) of the laminate was measured in a state of removing surface haze, a haze (Hb) of a product in which only silicone oil was introduced between the two measured glass plates was measured, and an internal haze (Hin) of the antireflection film was obtained by subtracting the haze (Hb) from the haze (Ha).

[3] A surface haze (Hout) of the antireflection film was obtained by subtracting the internal haze (Hin) from the total haze (H).

(7) Evaluation of Antifouling Property

The antireflection film was fixed on a glass plate by an adhesive so that the surface (antireflection layer side) was outermost surface. A circle having a diameter of 5 mm was drawn in triplet on the surface of the antireflection film with a black Magic Marker, "Mckie EXTRA FINE" (trade name, manufactured by ZEBRA CO., LTD.), at the nib (FINE) under conditions of 25° C. and 60% RH. At ten seconds after drawing, the antireflection film was wiped two roundly with a BEMCOT (trade name, manufactured by Asahi Kasei Corporation) folded up to ten layers while applying such load that a bundle of BEMCOTs were yield. An antifouling property was evaluated by observing a mark of the circle.

A: Mark of the circle cannot be observed.

B: Mark of the circle can be observed dimly.

C: Mark of the circle can be observed clearly.

TABLE 5

| Antireflection film sample No. | Light transmitting substrate | Hardcoat layer | Antireflection layer | Thickness of antireflection layer (μm) | Drying method | |
|---|---|---|---|---|---|---|
| 1 | TD60UL | A-1 | B-1 | 0.8 | Hot air drying | Ex. |
| 2 | TD60UL | A-1 | B-1 | 0.2 | Hot air drying | Ex. |
| 3 | TD60UL | A-1 | B-2 | 0.2 | Hot air drying | Ex. |
| 4 | TD60UL | A-1 | B-3 | 0.2 | Hot air drying | Ex. |
| 5 | TD60UL | A-1 | B-4 | 0.2 | Hot air drying | Ex. |
| 6 | TD60UL | A-1 | B-5 | 0.2 | Hot air drying | Ex. |
| 7 | TD60UL | A-1 | B-6 | 0.2 | Hot air drying | Ex. |
| 8 | TD60UL | A-1 | B-7 | 0.2 | Hot air drying | Ex. |
| 9 | TD60UL | A-1 | B-8 | 0.3 | Hot air drying | Ex. |
| 10 | TD60UL | A-1 | B-9 | 0.3 | Hot air drying | Ex. |
| 11 | TD60UL | A-1 | B-10 | 0.3 | Hot air drying | Ex. |
| 12 | TD60UL | A-1 | B-11 | 0.3 | Hot air drying | Ex. |
| 13 | TD60UL | A-1 | B-12 | 0.3 | Hot air drying | Ex. |
| 14 | TD60UL | A-1 | B-13 | 0.2 | Hot air drying | Ex. |
| 15 | TD60UL | A-1 | B-14 | 0.3 | Hot air drying | Ex. |
| 16 | TD60UL | A-1 | B-15 | 0.2 | Hot air drying | Ex. |
| 17 | TD60UL | A-1 | B-16 | 0.2 | Hot air drying | Ex. |
| 18 | TD60UL | A-1 | B-17 | 0.2 | Hot air drying | Ex. |
| 19 | TD60UL | A-1 | B-18 | 0.2 | Hot air drying | Ex. |
| 20 | TD60UL | A-1 | B-19 | 0.2 | Hot air drying | Ex. |
| 21 | TD60UL | A-1 | B-20 | 0.2 | Hot air drying | Ex. |
| 22 | TD60UL | A-1 | B-21 | 0.2 | Hot air drying | Ex. |
| 23 | TD60UL | A-1 | B-22 | 0.2 | Hot air drying | Ex. |
| 24 | TD60UL | A-1 | B-23 | 0.2 | Hot air drying | Ex. |
| 25 | TD60UL | A-1 | B-24 | 0.2 | Hot air drying | Ex. |
| 26 | TD60UL | A-1 | B-25 | 0.2 | Hot air drying | Ex. |
| 27 | TD60UL | A-1 | B-26 | 0.2 | Hot air drying | Ex. |
| 28 | TD60UL | A-2 | B-26 | 0.2 | Hot air drying | Ex. |
| 29 | Resin film 1 | A-2 | B-26 | 0.2 | Hot air drying | Ex. |
| 30 | TD60UL | A-1 | B-27 | 0.3 | Hot air drying | Ex. |
| 31 | TD60UL | A-1 | B-27 | 0.78 | Hot air drying | Ex. |
| 32 | TD60UL | A-1 | B-6 | 0.05 | Hot air drying | Ex. |
| 33 | TD60UL | A-1 | B-28 | 0.2 | Hot air drying | Ex. |
| 34 | TD60UL | A-1 | B-29 | 0.2 | Hot air drying | Ex. |
| 35 | TD60UL | A-1 | B-30 | 0.3 | Hot air drying | Ex. |
| 36 | TG40UL | A-3 | B-26 | 0.2 | Hot air drying | Ex. |
| 101 | PET | — | B-101 | 10 | Hot air drying | Comp. Ex. |
| 102 | PET | — | B-101 | 10 | Far infrared heating | Comp. Ex. |
| 103 | TD60UL | A-1 | B-102 | 0.2 | Hot air drying | Comp. Ex. |
| 104 | TD60UL | A-1 | B-103 | 0.2 | Hot air drying | Comp. Ex. |
| 105 | TD60UL | A-1 | B-104 | 0.2 | Hot air drying | Comp. Ex. |
| 106 | TD60UL | A-1 | B-105 | 0.2 | Hot air drying | Comp. Ex. |
| 107 | TD60UL | A-1 | B-106 | 0.2 | Hot air drying | Comp. Ex. |
| 108 | TG40UL | A-3 | B-107 | 0.1 | Hot air drying | Comp. Ex. |

| Antireflection film sample No. | Phase separation structure | Moth-eye structure | Period (nm) | Reflection index (%) | Surface haze (%) | Pencil hardness | Antifouling property |
|---|---|---|---|---|---|---|---|
| 1 | B | D | 380 | 1.5 | 0.9 | 4B | C |
| 2 | B | C | 190 | 1.2 | 0.6 | 4B | C |
| 3 | B | C | 200 | 1.2 | 0.8 | 2B | C |
| 4 | B | B | 190 | 1.0 | 0.6 | B | C |
| 5 | A | C | 250 | 0.7 | 0.8 | 2B | B |
| 6 | A | B | 210 | 0.5 | 0.5 | B | B |
| 7 | A | A | 200 | 0.5 | 0.5 | H | B |
| 8 | A | A | 190 | 0.5 | 0.5 | H | B |
| 9 | A | A | 250 | 0.5 | 0.8 | H | B |
| 10 | A | A | 250 | 0.5 | 0.9 | H | B |
| 11 | A | B | 250 | 0.6 | 0.8 | H | B |
| 12 | A | B | 250 | 0.5 | 0.9 | H | B |
| 13 | A | B | 250 | 0.4 | 0.8 | H | B |
| 14 | A | B | 190 | 0.5 | 0.5 | H | B |
| 15 | A | A | 250 | 0.4 | 0.9 | 2H | B |
| 16 | A | A | 210 | 0.5 | 0.6 | H | B |
| 17 | A | A | 210 | 0.6 | 0.5 | H | B |
| 18 | A | A | 210 | 0.5 | 0.5 | H | B |
| 19 | B | A | 250 | 0.7 | 0.8 | HB | B |
| 20 | A | A | 200 | 0.5 | 0.5 | H | B |
| 21 | B | A | 250 | 0.7 | 0.9 | H | B |
| 22 | A | A | 210 | 0.6 | 0.5 | H | B |
| 23 | A | A | 220 | 0.5 | 0.5 | H | B |
| 24 | A | A | 200 | 0.6 | 0.5 | H | B |
| 25 | A | A | 190 | 0.5 | 0.5 | H | B |
| 26 | A | A | 210 | 0.4 | 0.5 | H | B |

TABLE 5-continued

| | | | | | | | |
|---|---|---|---|---|---|---|---|
| 27 | A | A | 200 | 0.5 | 0.5 | H | A |
| 28 | A | A | 210 | 0.6 | 0.5 | H | B |
| 29 | A | A | 200 | 0.5 | 0.5 | H | B |
| 30 | A | A | 320 | 0.4 | 0.9 | H | B |
| 31 | A | A | 380 | 0.3 | 0.9 | H | B |
| 32 | A | B | 50 | 1.0 | 0.4 | H | B |
| 33 | A | A | 200 | 0.5 | 0.9 | HB | B |
| 34 | A | A | 200 | 0.6 | 0.8 | H | B |
| 35 | A | B | 250 | 0.4 | 0.9 | H | B |
| 36 | A | A | 190 | 0.6 | 0.6 | H | B |
| 101 | D | E | — | 4.2 | 5.0 | 4B | C |
| 102 | C | E | — | 3.0 | 3.0 | 4B | C |
| 103 | D | E | — | 4.0 | 0.5 | H | C |
| 104 | D | E | — | 4.0 | 0.5 | H | C |
| 105 | D | E | — | 2.0 | 1.1 | 2B | C |
| 106 | D | E | — | 4.1 | 3.0 | 2H | C |
| 107 | D | E | — | 3.9 | 0.5 | 2H | C |
| 108 | D | E | — | 2.1 | 0.2 | 2H | B |

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and there equivalents.

What is claimed is:

1. An antireflection film, comprising:
a light transmitting layer; and
an antireflection layer,
wherein the antireflection layer includes an unevenness structure on a surface at a side opposite to a side at which the light transmitting layer is provided,
the unevenness structure includes a phase separation structure in a sea-island form,
the phase separation structure in the sea-island form includes:
a sea part containing a cured product of an ionizing radiation curable monomer A including two or more polymerizable groups in a molecule; and
an island part containing an ionizing radiation curable polymer B including two or more polymerizable groups, and having a SP value lower by 0.5 or more than the ionizing radiation curable monomer A, a viscosity larger by 100 mPa·s than the ionizing radiation curable monomer A and a mass average molecular weight of 1000 or more,
the island part protrudes from the sea part to be a convex portion in the unevenness structure,
an area ratio of the sea part to the island part at an outermost surface of the antireflection layer is 1.0 or more,
a size of the island part which is the convex portion, and a period of a distance between convex portions adjacent to each other are 380 nm or less, and
a surface haze of the antireflection film is less than 1.0%.

2. The antireflection film according to claim 1, wherein a thickness of the antireflection layer is 0.05 to 0.78 μm.

3. The antireflection film according to claim 1,
wherein the antireflection layer further contains an inorganic fine particle D surface-treated with a silane coupling agent and having an average diameter of 10 to 300 nm.

4. The antireflection film according to claim 3,
wherein a molecular weight of the silane coupling agent is 90 to 600.

5. The antireflection film according to claim 3,
wherein a surface-modified ratio α of the silane coupling agent is 0.1 to 25%.

6. The antireflection film according to claim 3,
wherein the inorganic fine particle D is a metal oxide fine particle having a refractive index of 1.46 or less and at least containing a silicon atom on at least a surface of the metal oxide fine particle.

7. The antireflection film according to claim 1,
wherein the ionizing radiation curable polymer B including two or more polymerizable group is a fluorine-containing polymer represented by formula 1:

MF1$a$-MF2$b$-MF3$c$-MA$d$-MB$e$-MC$f$-MD$g$       formula 1 wherein a to f each represent a molar ratio of each unit, g represents a mass % in the fluorine-containing polymer, and a to g satisfies relationships of $0 \le a \le 70$, $0 \le b \le 70$, $0 \le c \le 80$, $30 \le a+b+c \le 90$, $1 \le d \le 50$, $0 \le e \le 50$, $0 \le f \le 50$ and $0 \le g \le 15$, MF1 represents a unit obtained by polymerizing a monomer represented by "$CF_2=CF-Rf_1$", wherein $Rf_1$ represents a perfluoroalkyl group having 1 to 5 carbon atoms, MF2 represents a unit obtained by polymerizing a monomer represented by "$CF_2=CF-ORf_{12}$", wherein $Rf_{12}$ represents a fluorine-containing alkyl group having 1 to 30 carbon atoms, MF3 represents a unit obtained by polymerizing a monomer represented by "$CH_2=CRo-L-Rf_{13}$", wherein Ro represents a hydrogen atom, a halogen atom or a methyl group, L represents a divalent linking group and $Rf_{13}$ represents a fluorine-containing alkyl group having 1 to 20 carbon atoms, MA represents a unit including at least one of a group having an unsaturated double bond and a ring-opening polymerizable group, MB represents an uncrosslinkable unit, MC represents a unit obtained by polymerizing a monomer having at least one polyalkylene oxide group, represented by formula 2:

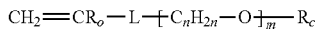

wherein Ro represents a hydrogen atom, a halogen atom or a methyl group, L represents a divalent linking group, Rc represents a hydrogen atom or an alkyl group having 1 to 10 carbon atoms, m represents an integer of 2 to 50, n represents an integer of 1 to 5, and when m is two or more, a plurality of "—($CnH_2n$-O)—" may be different, and MD represents a unit containing at least one polysiloxane structure.

8. The antireflection film according to claim 7, wherein L in formula 2 is a divalent linking group having 1 to 9 carbon atoms.

9. A polarizing plate comprising:
a polarizing film; and
at least one protective film for protecting at least one surface of the polarizing film,
wherein the at least one protective film is the antireflection film according to claim 1.

10. An image display apparatus, comprising:
the antireflection film according to claim 1.

11. A manufacturing method for an antireflection film including a light transmitting layer and an antireflection layer, wherein the antireflection layer includes an unevenness structure on a surface at a side opposite to a side at which the light transmitting layer is provided, the method comprising:
applying, above the light transmitting layer, a composition containing:
an ionizing radiation curable monomer A including two or more polymerizable groups in a molecule;
an ionizing radiation curable polymer B including two or more polymerizable groups, and having a SP value lower by 0.5 or more than the ionizing radiation curable monomer A, a viscosity larger by 100 mPa·s than the ionizing radiation curable monomer A and a mass average molecular weight of 1000 or more;
a polymerization initiator C; and
a solvent permeable into the light transmitting or an underlayer;
phase-separating the ionizing radiation curable monomer A and the ionizing radiation curable polymer B in a sea-island form;
permeating a part of the ionizing radiation curable monomer A into the light transmitting layer or the underlayer; and
curing the ionizing radiation curable monomer A and the ionizing radiation curable polymer B to form an antireflection layer having a phase separation structure in the sea-island form including a sea part constituted by a cured product of the ionizing radiation curable monomer A and an island part constituted by a cured product of the ionizing radiation curable polymer B and protruding from the sea part to be a convex portion,
wherein an area ratio of the sea part to the island part at an outermost surface of the antireflection layer is 1.0 or more, and
a size of the island part which is the convex portion, and a period of a distance between convex portions adjacent to each other are 380 nm or less, and
a surface haze of the antireflection film is less than 1.0%.

12. The manufacturing method for an antireflection film according to claim 11,
wherein the solvent E contains a solvent having a boiling point of more than 100° C.

13. A polarizing plate, comprising:
a polarizing film; and
at least one protective film for protecting at least one surface of the polarizing film,
wherein the at least one protective film is an antireflection film manufactured by the manufacturing method for an antireflection film according to claim 11.

14. An image display apparatus, comprising:
an antireflection film manufactured by the manufacturing method for an antireflection film according to claim 11.

15. An image display apparatus, comprising:
the polarizing plate according to claim 13.

* * * * *